United States Patent
Damola et al.

(10) Patent No.: US 9,294,897 B2
(45) Date of Patent: Mar. 22, 2016

(54) APPARATUSES AND METHODS FOR DOWNLOADING DATA

(71) Applicant: Telefonaktiebolaget L M Ericsson (publ), Stockholm (SE)

(72) Inventors: Ayodele Damola, Solna (SE); Lars Westberg, Enköping (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/382,621

(22) PCT Filed: Mar. 28, 2013

(86) PCT No.: PCT/SE2013/050354
§ 371 (c)(1),
(2) Date: Sep. 3, 2014

(87) PCT Pub. No.: WO2013/147695
PCT Pub. Date: Oct. 3, 2013

(65) Prior Publication Data
US 2015/0031344 A1     Jan. 29, 2015

Related U.S. Application Data

(60) Provisional application No. 61/618,005, filed on Mar. 30, 2012.

(51) Int. Cl.
*H04W 4/20*     (2009.01)
*H04W 4/02*     (2009.01)
*H04W 8/08*     (2009.01)

(52) U.S. Cl.
CPC ............... *H04W 4/20* (2013.01); *H04W 4/025* (2013.01); *H04W 8/08* (2013.01)

(58) Field of Classification Search
CPC .......... H04W 4/20; H04W 8/08; H04W 4/025
See application file for complete search history.

(56) References Cited

U.S. PATENT DOCUMENTS

| | | | |
|---|---|---|---|
| 6,597,906 B1 | 7/2003 | Van Leeuwen et al. | |
| 2001/0034239 A1 * | 10/2001 | Yamato et al. | 455/456 |
| 2004/0017310 A1 | 1/2004 | Vargas-Hurlston et al. | |
| 2011/0028160 A1 * | 2/2011 | Roeding et al. | 455/456.1 |
| 2011/0117937 A1 * | 5/2011 | Meifu et al. | 455/456.6 |
| 2013/0267253 A1 * | 10/2013 | Case et al. | 455/456.3 |

FOREIGN PATENT DOCUMENTS

WO     2010/052570 A1     5/2010

OTHER PUBLICATIONS

"Comparison Shopping Website," http://en.wikipedia.org/w/index.php?title=Comparison_shopping_website&redirect=no; downloaded Nov. 3, 2014.
"Linear Network Coding," http://en.wikipedia.org/w/index.php?title=Linear_network_coding&redirect=no; downloaded Nov. 3, 2014.

(Continued)

*Primary Examiner* — Leon Flores
(74) *Attorney, Agent, or Firm* — Patent Portfolio Builders PLLC

(57) ABSTRACT

A method and network apparatus for downloading data from the network apparatus to a mobile device in anticipation of the mobile device entering a black spot zone. The network apparatus determines that the mobile device has entered a predetermined tracking zone related to the black spot zone and gathers information for defining a download zone for the mobile device taking into consideration a time necessary for downloading the data to the mobile device, and a predicted time interval until the mobile device enters the black spot zone. The network apparatus then sends the data to the mobile device when the mobile device enters the download zone.

21 Claims, 19 Drawing Sheets

(56) References Cited

OTHER PUBLICATIONS

Finley, Darel Rex, "Point-In-Spline-Polygon Algorithm—Testing Whether A Point Is Inside A Complex Polygon With Spline Curves," http://alienryderflex.com/polyspline/; downloaded Nov. 3, 2014.

Williams, Mike, "Google Maps API Tutorial," http://econym.org.uk/gmap/inside.htm; downloaded Nov. 3, 2014.

International Search Report issued in corresponding International application No. PCT/SE2013/050354, date of mailing Oct. 15, 2013.

* cited by examiner

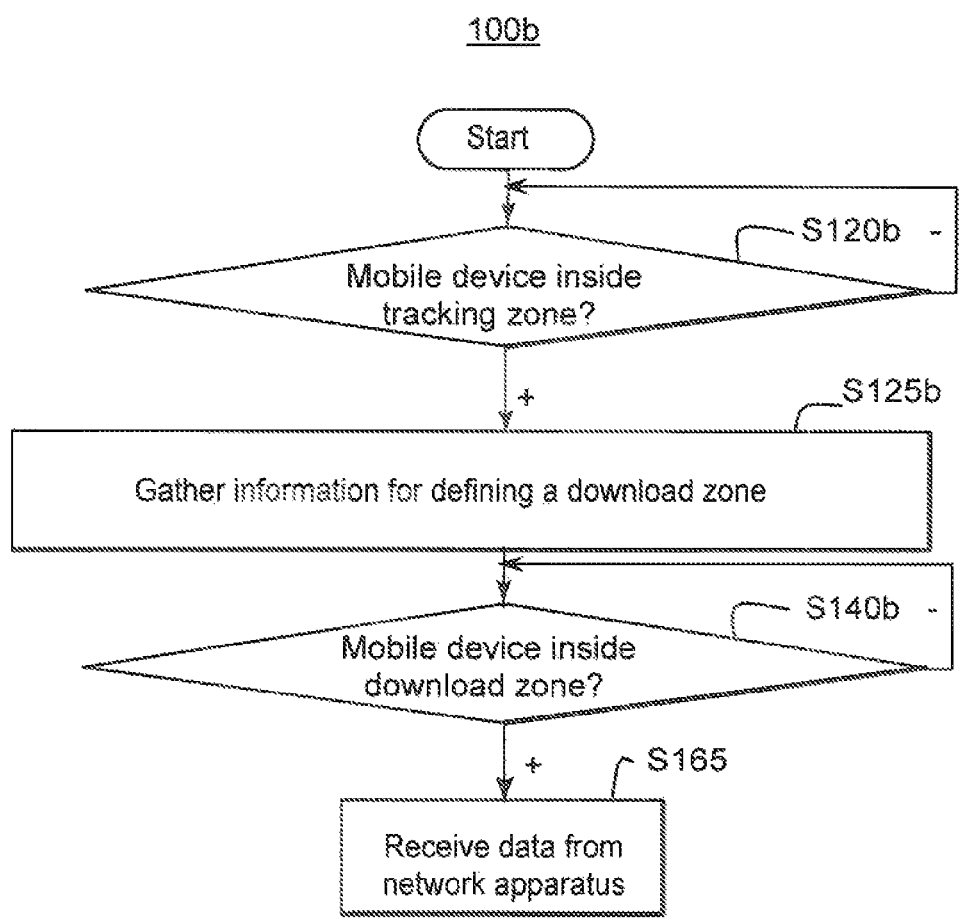

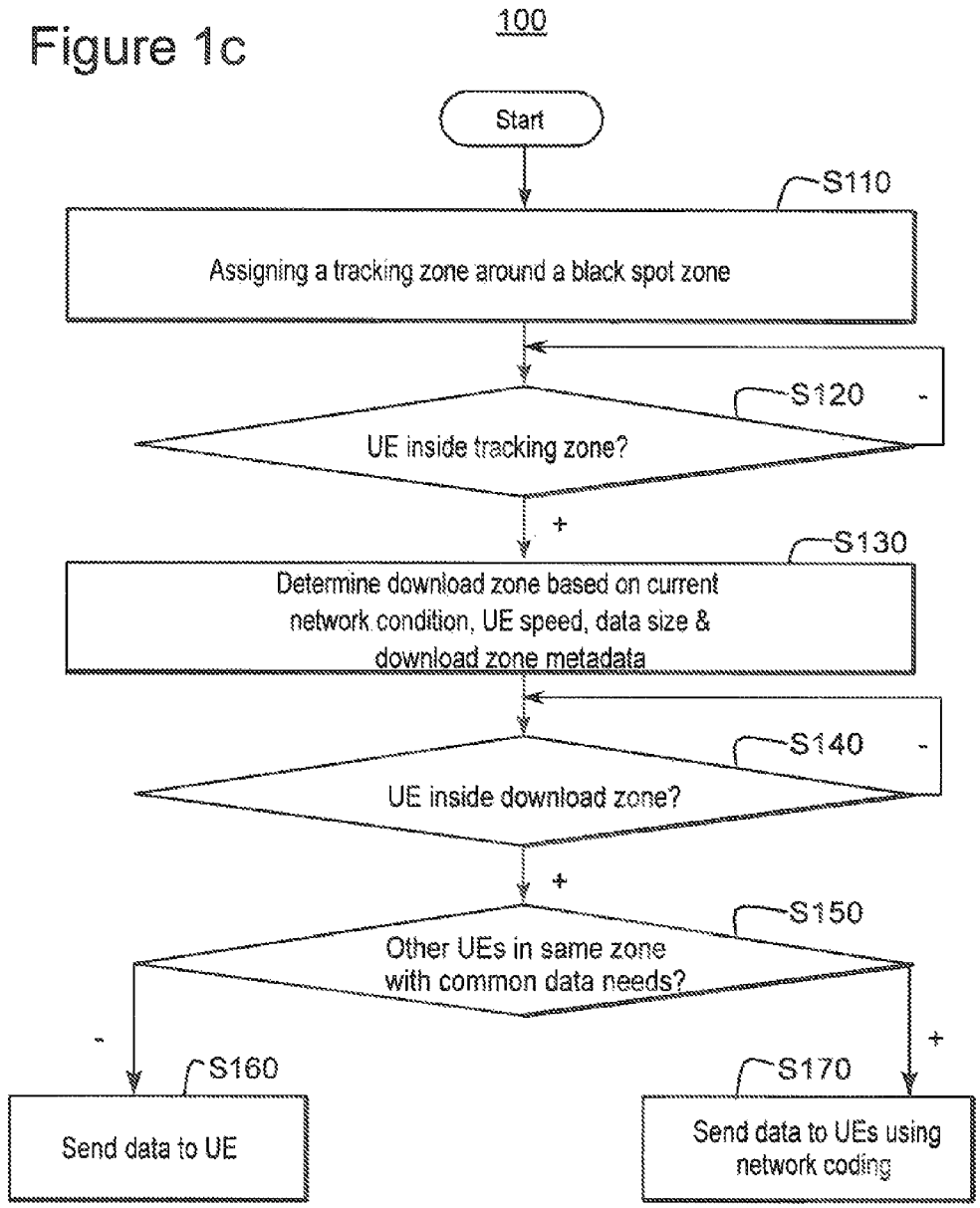

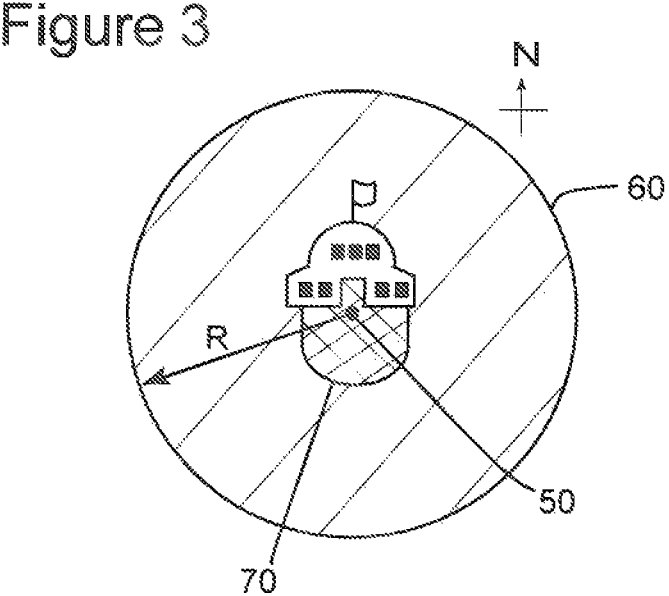
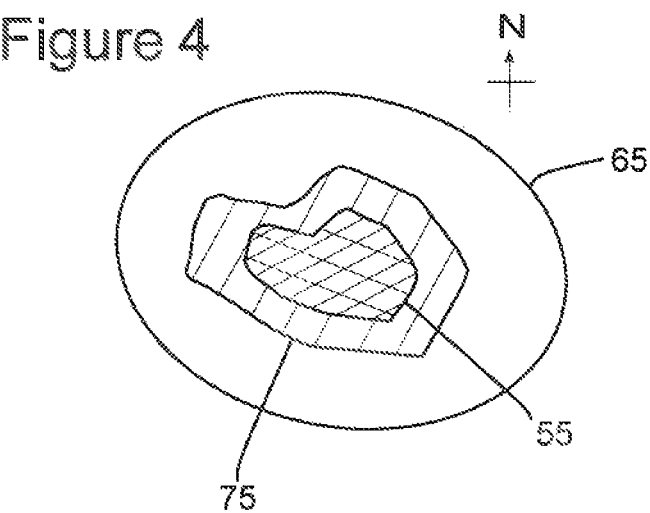

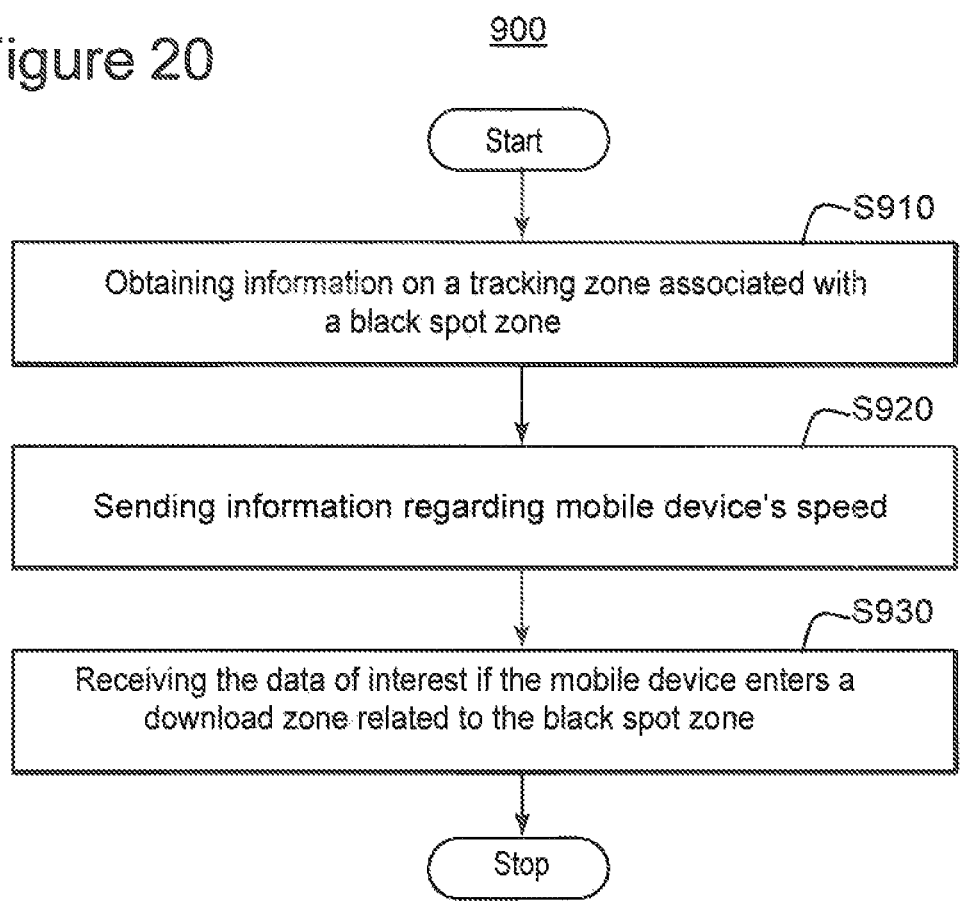

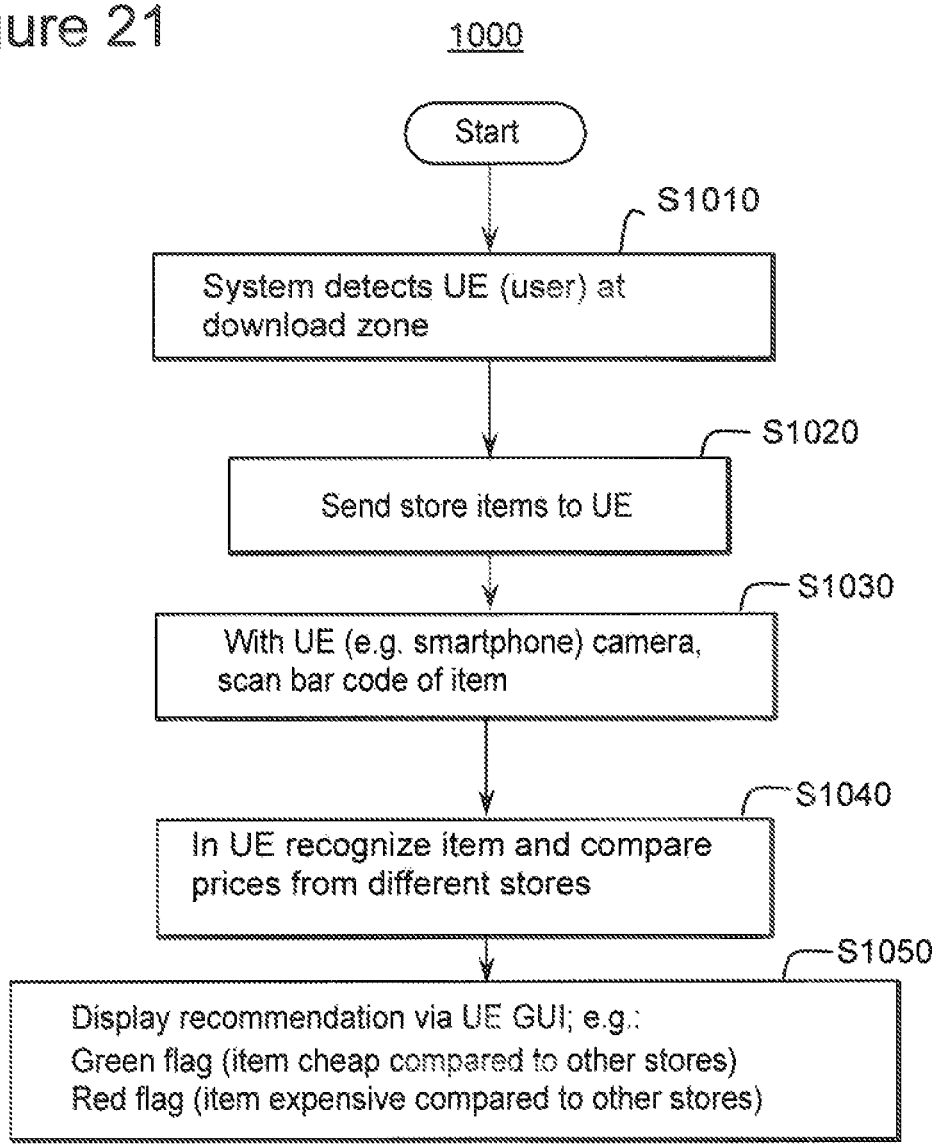

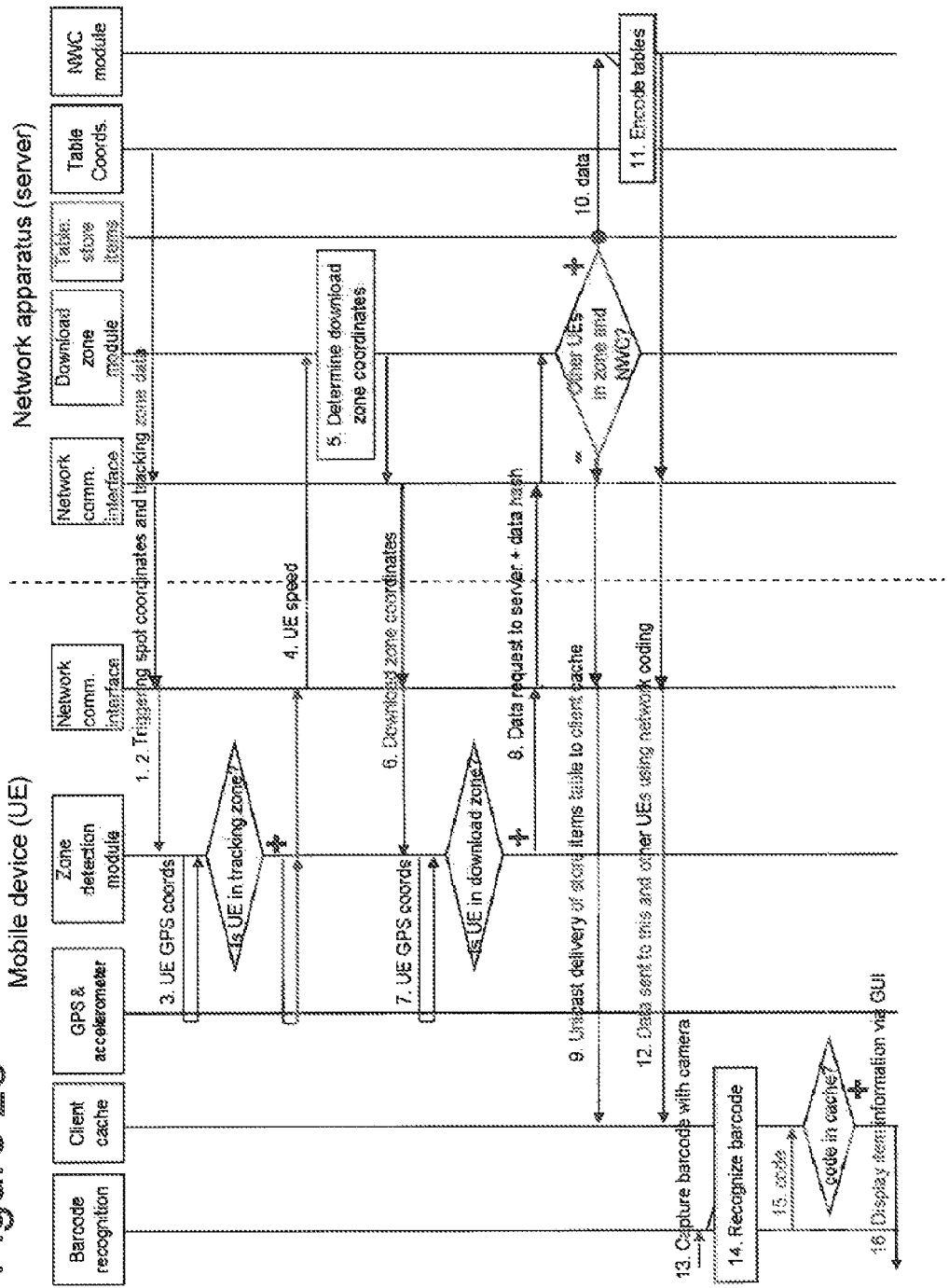

APPARATUSES AND METHODS FOR DOWNLOADING DATA

TECHNICAL FIELD

The present disclosure generally relates to apparatuses and methods for downloading data to mobile devices in anticipation to entering a black spot zone.

BACKGROUND

In the last years, the mobile devices have become ubiquitous, applications for the mobile devices have flooded the market, and clients' expectations for omnipresent high quality service have challenged the network services providers. The current applications for services that rely on constant availability of data transfer are affected by network outages in areas where the mobile network coverage is absent (e.g. underground areas, shielded areas, etc.) or in crowded areas, such as stores, where data transfer may become sluggish. Applications that rely on constant availability of data transfer include (but are not limited to): augmented reality like comparison shopping, navigation applications (e.g., Google Maps), music streaming, tourist applications, etc.

The lack of network communication or sluggish network communication frustrates the users, and, therefore, results in a loss of potential business for the application service provider, who makes the service available to end users (e.g., via smartphone applications).

Accordingly, it would be desirable to provide apparatuses and methods that would alleviate the impact of the sluggish network communication or lack of network communication in certain zones.

SUMMARY

Network devices and methods according to various embodiments are capable to preemptively download data into a mobile device, in anticipation of the mobile device entering a "black spot" zone (e.g., with sluggish or no network access). A download zone related to the black spot zone is defined dynamically, e.g., depending on factors affecting a time necessary for downloading data of interest to the mobile device and a time interval until the mobile device enters the black spot zone, such as, current network load, a speed of the mobile device, a volume of the data, a predicted time while the mobile device is going to be in the black spot zone, etc. Defining the download zone for a mobile device is triggered by the mobile device entering a tracking zone that is pre-defined relative to the black spot zone.

Accordingly, the present disclosure presents a method for downloading data to a mobile device in anticipation of the mobile device entering a black spot zone. The method includes determining that a mobile device has entered a pre-determined tracking zone related to a black spot zone. The method further includes defining a download zone for the mobile device taking into consideration a time necessary for downloading the data to the mobile device, and a predicted time interval until the mobile device enters the black spot zone. The method further includes sending the data when the mobile device enters the download zone. Some or all steps may be performed in a network apparatus.

According to a first aspect, there is a method performed by a network apparatus for downloading data from the network apparatus to a mobile device in anticipation of the mobile device entering a black spot zone. The method comprises, in the network apparatus, determining that the mobile device has entered a predetermined tracking zone related to the black spot zone. The method further comprises gathering information for defining a download zone for the mobile device taking into consideration a time necessary for downloading the data to the mobile device, and a predicted time interval until the mobile device enters the black spot zone. The method also comprises sending the data from the network apparatus to the mobile device when the mobile device enters the download zone.

One embodiment may further include optimizing sending data by aggregating first data for a first mobile device and second data for a second mobile device using network coding. For example, the method may further include determining whether there is another mobile device in the same zone as the mobile device, and sending first data for the mobile device and second data for the another mobile device using network coding, if determined that the another mobile device is present in the same zone.

According to a second aspect, there is a method performed by a mobile device for downloading data from a network apparatus to the mobile device in anticipation of the mobile device entering a black spot zone. The method comprises, in the mobile device, determining that the mobile device has entered a predetermined tracking zone related to the black spot zone. The method further comprises gathering information for defining a download zone for the mobile device taking into consideration a time necessary for downloading the data to the mobile device, and a predicted time interval until the mobile device enters the black spot zone. The method also comprises receiving the data from the network apparatus when the mobile device enters the download zone.

According to one exemplary embodiment of the second aspect there is a method performed by a mobile device to enable receiving data of interest in anticipation of the mobile device entering a black spot zone. The method includes obtaining information on a tracking zone associated with the black spot zone. The method further includes sending information regarding mobile device's speed. The method also includes receiving the data of interest if the mobile device enters a download zone related to the black spot. The method may also include obtaining information on the download zone and sending an indication upon determining that the mobile device is in the download zone.

According to a third aspect, there is a network apparatus for downloading data to a mobile device in anticipation of the mobile device entering a black spot zone, the network apparatus having a network communication interface and a data processing unit. The network communication interface is configured to enable data exchange with other devices via a network. The data processing unit is configured to determine that a mobile device has entered a predetermined tracking zone related to a black spot zone. The network communication interface is further configured to gather information for defining a download zone for the mobile device taking into consideration a time necessary for downloading the data to the mobile device, and a predicted time interval until the mobile device enters the black spot zone. The network communication interface is also configured to send the data via the network communication interface, when the mobile device enters the download zone.

According to one exemplary embodiment of the third aspect, the data processing unit is configured (1) to determine that a mobile device has entered a predetermined tracking zone related to a black spot zone, (2) to define a download zone for the mobile device taking into consideration a time necessary for downloading data of interest to the mobile device, and a predicted time interval until the mobile device enters the black spot zone, and (3) to send the data via the network communication interface, when the mobile device enters the download zone.

In one embodiment, the network apparatus may further include one or more of a coordinate module, a network cache module, and a network coding module. The coordinate module is configured to store coordinates related to one or more black spot zones and associated predetermined tracking zones. The network cache module is configured to retrieve from various sources in the network and temporarily store the data of interest. The network coding module is configured to determine if there is another mobile device in the same zone as the mobile device, to send first data for the mobile device and second data for the another mobile device using network coding.

According to a fourth aspect, there is a mobile device for downloading data from a network apparatus in anticipation of the mobile device entering a black spot zone, the mobile device having a network communication interface and a data processing unit. The network communication interface is configured to enable data exchange with other devices via a network. The data processing unit is configured to determine that the mobile device has entered a predetermined tracking zone related to the black spot zone. The data processing unit is further configured to gather information for defining a download zone for the mobile device taking into consideration a time necessary for downloading the data to the mobile device, and a predicted time interval until the mobile device enters the black spot zone. The data processing unit is further configured to receive the data via the network communication interface, when the mobile device enters the download zone.

According to an exemplary embodiment of the fourth aspect, the data processing unit is configured to determine that a current location of the mobile device is inside a tracking zone associated with a black spot zone, and to provide position and speed information via the network communication interface to a network apparatus configured to send data to the mobile device in anticipation of the mobile device entering the black spot zone.

According to a fifth aspect, there is a computer-readable storage medium storing computer program instructions which, if executed by a processor, cause the processor to perform any one of the methods as set out in the above.

According to a sixth aspect, there is a computer program which, when run on a device or apparatus, causes the device or apparatus to perform the steps as described in any one of the above methods.

Embodiments described in this document provide the advantage of making it possible for mobile devices entering black spot zones to continue using various applications (music, shopping, maps) by preemptively downloading data of interest. Network operators and service providers may expect an increase of business since users would found the services employing these embodiments to be more reliable, i.e., being less or not at all affected by "black spot" zones.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 1b is a flow diagram of a method performed by a mobile device for alleviating the impact of black spot zones, according to an exemplary embodiment;

FIG. 1c is a flow diagram of a method for alleviating the impact of black spot zones, according to another exemplary embodiment;

FIGS. 3 and 4 are schematic diagrams illustrating the terms triggering spot, black spot zone, download zone and tracking zone, which terms are used in describing various embodiments;

FIG. 20 is a flow diagram of a method performed by a mobile device to enable receiving data of interest in anticipation of the mobile device entering a black spot zone according to an exemplary embodiment.

FIG. 21 is a flow diagram of a method performed by a mobile device according to an exemplary embodiment.

FIGS. 22a and 22b shows tables for augmented reality comparison shopping according exemplary embodiments.

FIG. 23 is a signaling diagram according an exemplary embodiment.

DETAILED DESCRIPTION

Figure 1A:
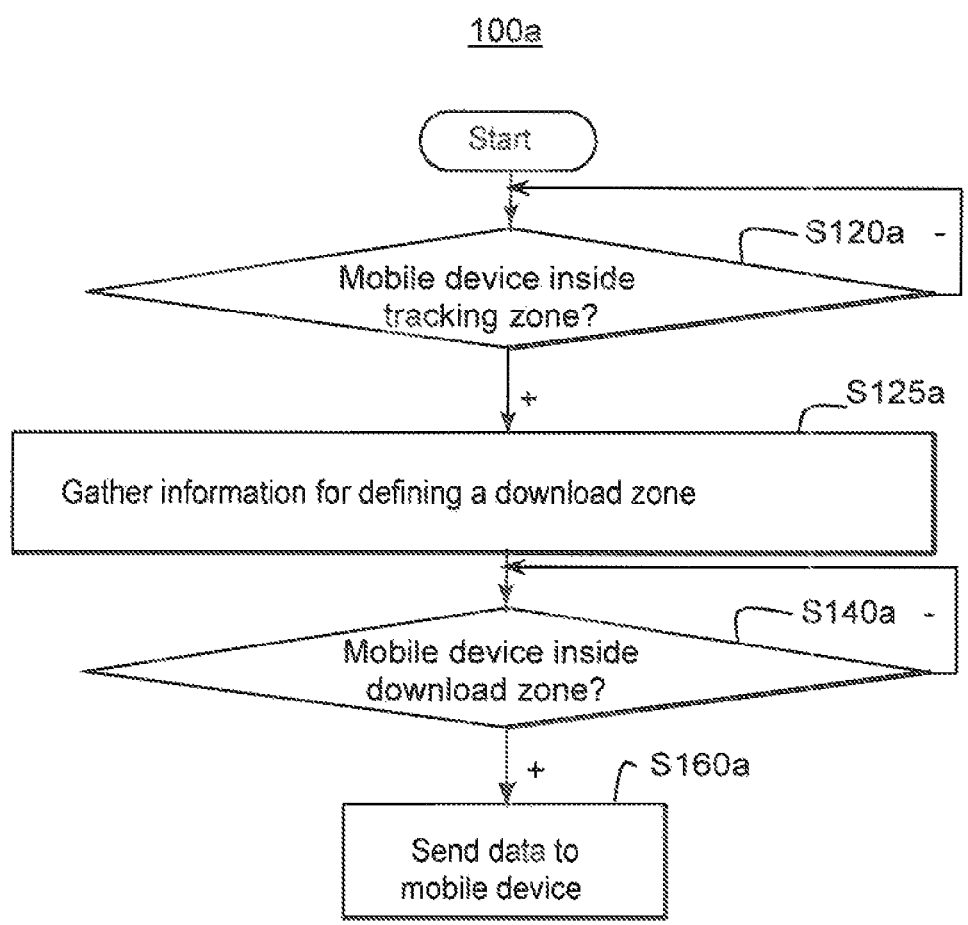
FIG. 1a is a flow diagram of a method performed by a network apparatus for alleviating the impact of black spot zones, according to an exemplary embodiment.

The following description of the exemplary embodiments refers to the accompanying drawings. The same reference numbers in different drawings identify the same or similar elements. The following detailed description does not limit the embodiments. The following embodiments are discussed, for simplicity, with regard to the terminology and structure of a network communication system. However, the embodiments to be discussed next are not limited to these systems, but may be applied to other existing systems that provide services based on exchanging packets of data among devices.

Reference throughout the specification to "one embodiment" or "an embodiment" means that a particular feature, structure, or characteristic described in connection with an embodiment is included in at least one embodiment of the present disclosure. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Many applications frequently used on mobile devices (e.g., music streaming, or maps) rely on permanent capability to exchange data via the network. Conventionally, when a mobile device enters a "no-connectivity" zone (e.g., an underground tunnel), these applications are interrupted, and these interruptions cause users' dissatisfaction. In a different scenario, in crowded locations (e.g., a store) many users of mobile devices may want to download data via the network in the same time and at the same location (e.g., shopping information pertinent to the products offered in the store). This high demand results in slowing down data transfer, which sluggishness may cause the users to abandon accessing and using the applications and services based on this downloaded data. Apparatuses and methods according to various embodiments described below are configured to alleviate the sluggish network communication or lack of network communication in certain zones (e.g., an underground tunnel area or a store area) generically named "black spot" zones, by transferring relevant data for an application relying on permanent capability to exchange data via the network, into a storage of a mobile device located in a geographic area adjacent to a black spot zone.

FIG. 3 is used to clarify several terms used below to describe the various embodiments. A triggering spot 50 is a physical location that may be used to define a black spot zone. For example, the triggering spot 50 may be the entrance of a store, and the corresponding black spot zone may for example be North of the triggering spot 50, and defined by the area of the store.

A tracking zone 60 is an area surrounding the black spot zone. Once a mobile device enters the tracking zone 60, the mobile device is monitored to gather information about its motion, applications, etc., in order to determine whether pre-emptive data download to the mobile device is necessary, and when it has to be done. The tracking zone 60 may for example be a circle having a defined radius such as R=20 m around the triggering spot 50.

A download zone 70 is defined inside the tracking zone 60, for each mobile device e.g. based on the gathered information about the mobile device as well as information e.g. of the network load and the volume of the data. If the mobile device enters its download zone 70, data of interest is transferred to the mobile device.

Alternatively, the black spot zone 55 may be defined as a polygon or another shape, for example, by a set of coordinates corresponding to the corners of the polygon as illustrated in FIG. 4. The tracking zone 65 may have another more general shape (i.e., an oval in FIG. 4). The download zone 75 may mimic the shape of the black spot zone 55.

A flow diagram of a method 100a performed in a network apparatus for alleviating the impact of a black spot zone is illustrated in FIG. 1a. The method is thus useful for downloading data from the network apparatus to a mobile device (90) in anticipation of the mobile device entering a black spot zone. The method comprises, in the network apparatus, determining S120a that the mobile device has entered a predetermined tracking zone related to the black spot zone. The method further comprises gathering information S125a for defining a download zone for the mobile device taking into consideration a time necessary for downloading the data to the mobile device, and a predicted time interval until the mobile device enters the black spot zone, preferably the download zone is defined in the network apparatus. However, in some embodiments the download zone may be defined in the mobile device. The method further comprises sending S160a the data from the network apparatus to the mobile device when the mobile device enters S140a the download zone.

To determine that the mobile device has entered the tracking zone may be understood as either to determine, by evaluating based on available data, e.g. the location and extent of the tracking zone and the current location of the mobile device, that the mobile device has entered the tracking zone, or to determine that the mobile device has entered the tracking zone by receiving information or an indication that the mobile device has, in fact, entered the tracking zone.

In one embodiment of the method 100a the defining of the download zone is performed in the network apparatus. In this embodiment the gathering of information may comprise the network apparatus receiving information regarding mobile device's speed from the mobile device. This enables the network apparatus to define the download zone, possibly after identifying/gathering additional information, such as the volume of the data, useful for defining/calculating the download zone.

In one embodiment of the method 100a, determining that the mobile device has entered the tracking zone comprises receiving, in the network device, information of the mobile device's speed from the mobile device. In further embodiments, the receiving of information of the mobile device's speed may trigger the gathering of the information on the mobile device's speed, as well as other information, such as the volume of the data to be downloaded to the mobile device, and the gathered information is then used for defining the download zone. To define a download zone may thus in one embodiment be understood as gathering information and subsequently defining a download zone based on the gathered information.

In another embodiment of the method 100a the method further comprises, in the network apparatus, upon determining that the mobile device has entered the tracking zone, sending at least information regarding the volume of the data to the mobile device. Thereby the mobile device is enabled, possibly after identifying/gathering additional information, to define the download zone by use of the information, where after the method comprises receiving information defining the download zone from the mobile device.

In one embodiment, the method 100a further comprises determining S150 that there is a second mobile device (90b) in the same download zone as the mobile device, and further sending S170 second data for the second mobile device (90b) using network coding. In this embodiment, the step of sending S170 data to the mobile device (90) is thus understood as sending data to the mobile device (90) and sending second data to the second mobile device (90b) using network coding, as an alternative to sending data only to the mobile device (90).

In other embodiments, the method 100a further comprises determining S120a that the mobile device has entered the tracking zone comprises receiving, in the network apparatus, information, or an indication, from the mobile device that the mobile device has entered the tracking zone.

A flow diagram of a further method 100 for alleviating the impact of black spot zones is illustrated in FIG. 1c. The location and extent of the black spot zones is known or may be defined relative to a triggering spot. For simplicity, the method 100 is described here in terms of a single black spot zone and a single mobile device, but it should be understood that plural black spot zones and plural mobile devices are treated in the same manner. The method 100 first includes assigning a tracking zone around the black spot zone, at S110. The tracking zone is assigned to balance the effectiveness of applying the method (i.e., to have enough time to download data into the mobile devices if deemed necessary) with reasonable management (not to track to too many devices and download too much data depleting the network bandwidth).

If a mobile device enters the tracking zone, it becomes a candidate for preemptively download data, at S120. In order to download data in the mobile device in anticipation of the mobile device entering the black spot zone, information about the mobile device is gathered once the mobile device is inside the tracking zone. The gathered information may include whether and what applications that rely on permanent constant availability of data transfer are currently used (e.g., music streaming) or may be used (e.g., maps), whether pertinent data has already been downloaded in the mobile device and it is up-to-date, a volume of the data of interest (i.e., the data that may need to be downloaded in the mobile device prior to entering the black spot zone), the mobile device's download rate capability, mobile device's speed, network load, etc. Based on this information, a download zone is defined for the mobile device, at S130, such that a time necessary for downloading data of interest to the mobile device to exceed or at least be equal to a time interval until the mobile device enters the black spot zone.

After the mobile device enters the download zone, at S140, the data of interest is sent to the mobile device at S160 or S170. Network coding may be used to maximize the information flow in order to optimize the manner of sending the data, by combining data packets to be sent to different mobile devices and sending a combined packet instead of sending individual packets to each mobile device. Using this type of optimization is beneficial, but not required. Thus, in this embodiment at S150, it is determined whether there is another mobile device located in the same area as the mobile device and ready to receive data simultaneously. If another device is not found, the data is transmitted to the mobile device at S160. If another device is found, the data for the mobile device and the data for the other mobile device are combined using network coding and sent at S170.

A flow diagram of a method 100b performed in a mobile device for alleviating the impact of a black spot zone is illustrated in FIG. 1b. The method is thus useful for downloading data from a network apparatus to the mobile device in anticipation of the mobile device entering a black spot zone. The method comprises, in the mobile device, determining S120b that the mobile device has entered a predetermined tracking zone related to the black spot zone. The method further comprises gathering information S125b for defining a download zone for the mobile device taking into consideration a time necessary for downloading the data to the mobile device, and a predicted time interval until the mobile device enters the black spot zone. The method further comprises receiving S165 the data from the network apparatus when the mobile device enters S140b the download zone.

According to one embodiment of the method 100b, the defining of the download zone is performed in the mobile device.

In one embodiment, the method 100b further comprises the mobile device, upon entering the tracking zone, receiving information on a volume of the data to be downloaded to the mobile device from the network apparatus.

In other embodiments of the method 100b, the gathering of the information comprises the mobile device collecting/identifying the information of the mobile device's speed and sending information regarding the mobile device's speed to the network apparatus. This will enable the network apparatus to define the download zone by calculating the download zone using the information of the mobile device's speed and possibly other information gathered in the network apparatus, such as the volume of the data to be downloaded to the mobile device.

In one embodiment of the methods 100, 100a and 100b, factors affecting the time necessary for downloading the data to the mobile device are one or more of current network load, a volume of the data, a predicted time while the mobile device is going to be in the black spot zone.

In one embodiment of the methods 100, 100a and 100b, factors affecting the time interval until the mobile device enters the black spot zone is a speed of the mobile device.

Figure 2:
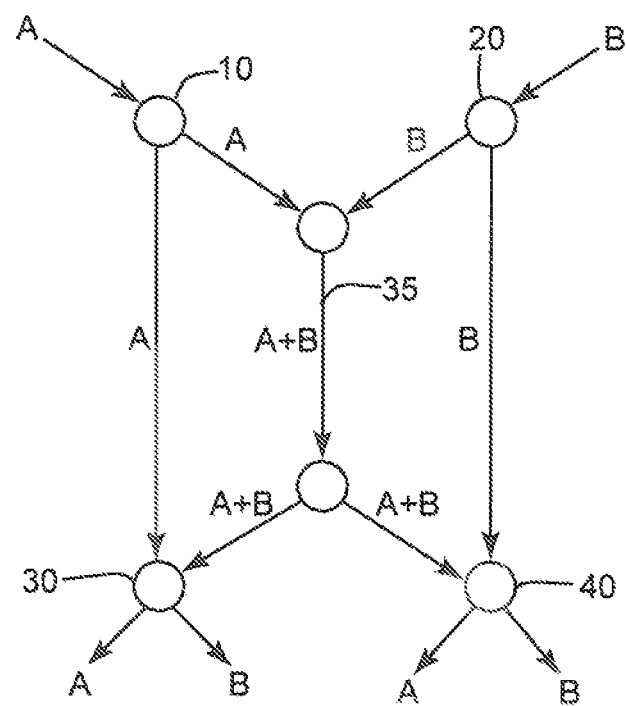
FIG. 2 illustrates the concept of network coding.

In order to illustrate the concept of network coding, FIG. 2 illustrates a "butterfly" network, in which information (e.g., values A and B) from two source nodes 10 and 20 has to reach two destination nodes 30 and 40. Node 10 is directly connected to node 30 and may send information to node 40 via a center line 35. Node 20 is directly connected to node 40 and may send information to node 30 via the center line 35. Each of the edges (i.e., lines) can carry a single value (e.g., an edge transmitting a bit in each time slot).

In this configuration, routing by itself cannot assure transmitting both A and B simultaneously to both destination nodes because a single value can be transmitted via the center line (i.e., A or B, but not both). If value A is sent via the center line, then the destination node 30 would receive value A twice, but never value B. If value B is sent via the center line, then the destination node 40 would receive value B twice, but never value A.

Using a simple code, as shown, both A and B reach both destinations simultaneously, by sending the sum of the symbols through the center (in other words, values A and B are encodes using the formula "A+B"). The binary operator A+B is called XOR or exclusive OR. Node 30 receives A and A+B, and recovers B by subtraction, and node 40 receives B and A+B and recovers A by subtraction. This is a linear code because the encoding and decoding schemes are linear operations.

Although at the middle of the butterfly network, three messages (A, B, and A+B) are being transmitted, four messages (A and B at both node 30 and node 40) are retrieved. Note that a message storage in the middle center router could store messages A and B and still provide all four messages to the endpoints (i.e., four messages are received for the cost of two messages, a 100% improvement).

As mentioned above, the black spot zone 55 may, alternatively be defined as a polygon or another shape, for example, by a set of coordinates corresponding to the corners of the polygon as illustrated in FIG. 4. The tracking zone 65 may have another more general shape (i.e., an oval in FIG. 4). The download zone 75 may mimic the shape of the black spot zone 55.

In order to determine whether a mobile device is currently located within a zone available algorithms may be used. For example, an algorithm described in "Point-In-Spline-Polygon Algorithm" by Darel Rex Finley enables to test if a point is insides a polygon having curved edges. The complex polygons could have different shapes. In Google Maps API Tutorial, Mike Williams, 2009, it is described a script function called. Contains(lating) that was developed based on this algorithm and which enables to test if a geographic point (latitude, longitude) is present in a given polygon in Google Maps. Thus, mobile device's Global Positioning System (GPS) type of information together with a zone definition may be processed using such an implementation to determine whether the mobile device is located inside the zone.

Figure 5:
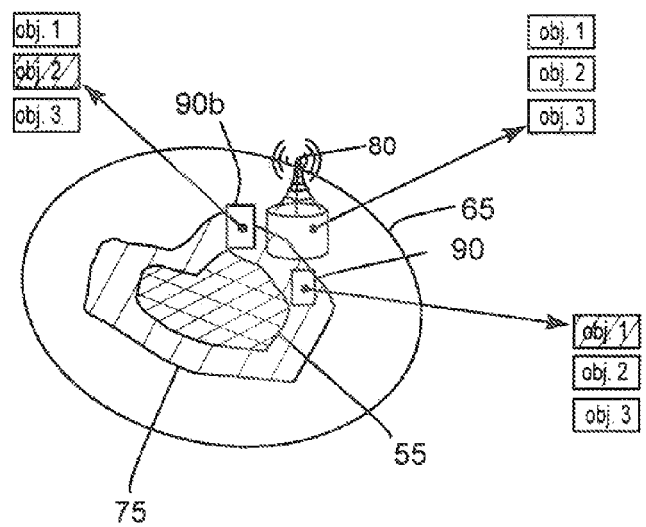
FIG. 5 illustrates data objects stored in a network apparatus and mobile devices according to an exemplary embodiment.

The data of interest associated with a black spot zone 55 (here, the fact that the black spot zone is defined as a polygon is an illustration and not a limitation) may be a collection of objects (Obj. 1, Obj. 2, Obj. 3) whose current version stored in a network cache 80 as illustrated in FIG. 5. For example, the objects may be information pertinent to different types of products sold by a store. A mobile device 90 inside the tracking zone 65 may store (e.g., from an earlier download) an outdated version of Obj. 1, and current versions of Obj. 2 and Obj. 3. A second mobile device 90b inside the tracking zone 65 stores a current version of Obj. 1, an outdated version of Obj. 2 and a current version of Obj. 3. Thus, upon entering the download zone 75, data of interest for the mobile device 90 is the current version of Obj. 1 and data of interest for the second mobile device 90b is the current version of Obj. 2. There is not necessary to download the current version of Obj. 3 to the mobile terminals. The data of interest may be combined using network coding to transmit from the network cache Obj.1+Obj.2. Upon receiving the combined packet each of mobile devices extracts respective data of interest to have preloaded a complete set of objects if/when entering the black spot zone.

Figure 6:
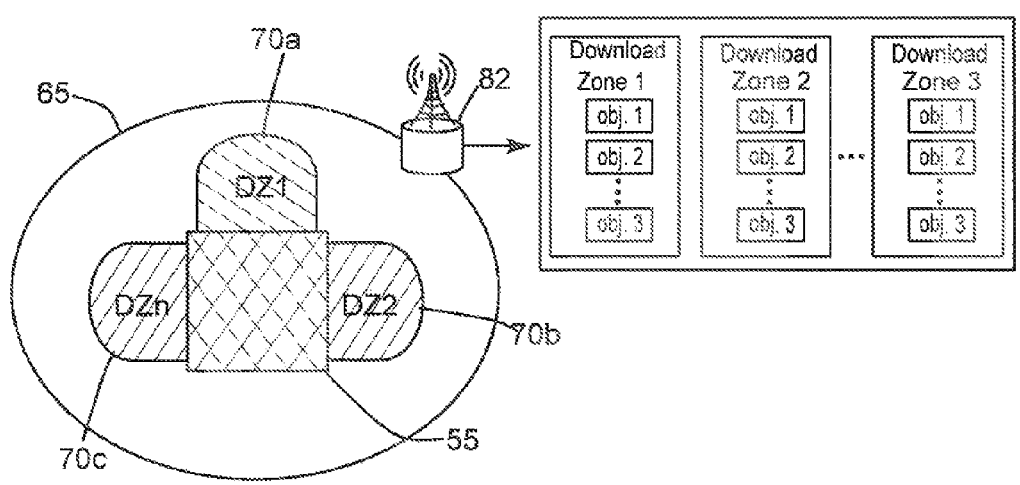
FIG. 6 illustrates a network cache storing sets of objects for various download zones according to an exemplary embodiment.

As illustrated in FIG. 6, several different download zones 70a, 70b, 70c associated with different sets of objects may be defined inside the same tracking zone 65, relative to the same black spot zone 55 (e.g., a building with several entrances). A network device 82 may store (e.g., in a cache memory) different sets of objects for the different zones.

Figure 7:
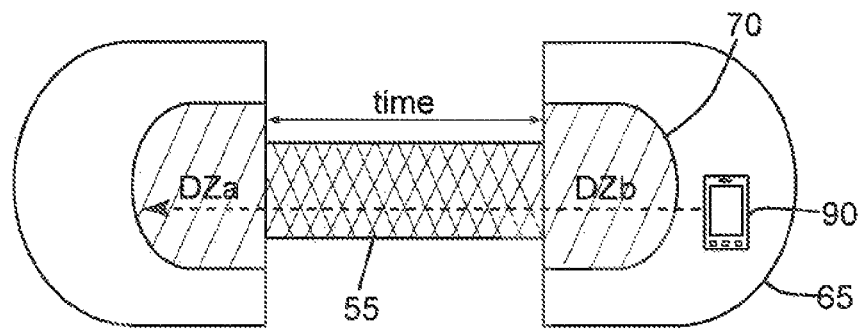
FIG. 7 illustrates an extended black spot zone between two download zones according to an exemplary embodiment.

FIG. 7 schematically illustrates a situation in which the black spot zone 55 is an underground tunnel. In this situation, based on the speed of the mobile device 90 (gathered once the mobile device is detected to be inside the tracking zone 65), the time it takes the mobile device to pass through the tunnel may be determined. Once this time is known it can be determined the amount of data (e.g., objects) to be downloaded in anticipation of the mobile device 90 crossing the black spot zone 55. By further also estimating download rate (depending e.g., on the mobile device's capacity and network load), and using again the speed of the mobile device 90, the download zone 70 may be defined. Thus, for example, it may be downloaded enough music such as no interruption in playing music using the mobile device to occur while passing through the tunnel.

Figure 8:
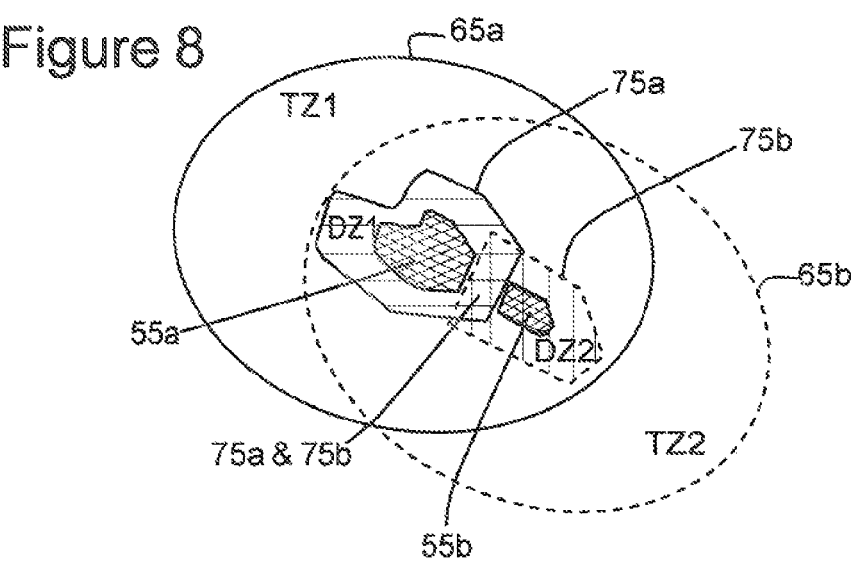
FIG. 8 illustrates overlapping download zones according to an exemplary embodiment.

Sometimes, as illustrated in FIG. 8, black spot zones 55a and 55b may be close to one another, so that the corresponding tracking zones 65a and 65b and download zones 75a and 75b overlap. This overlap creates (in a different manner than discussed above) the opportunity to use network coding to optimize the data flow.

Figure 9:
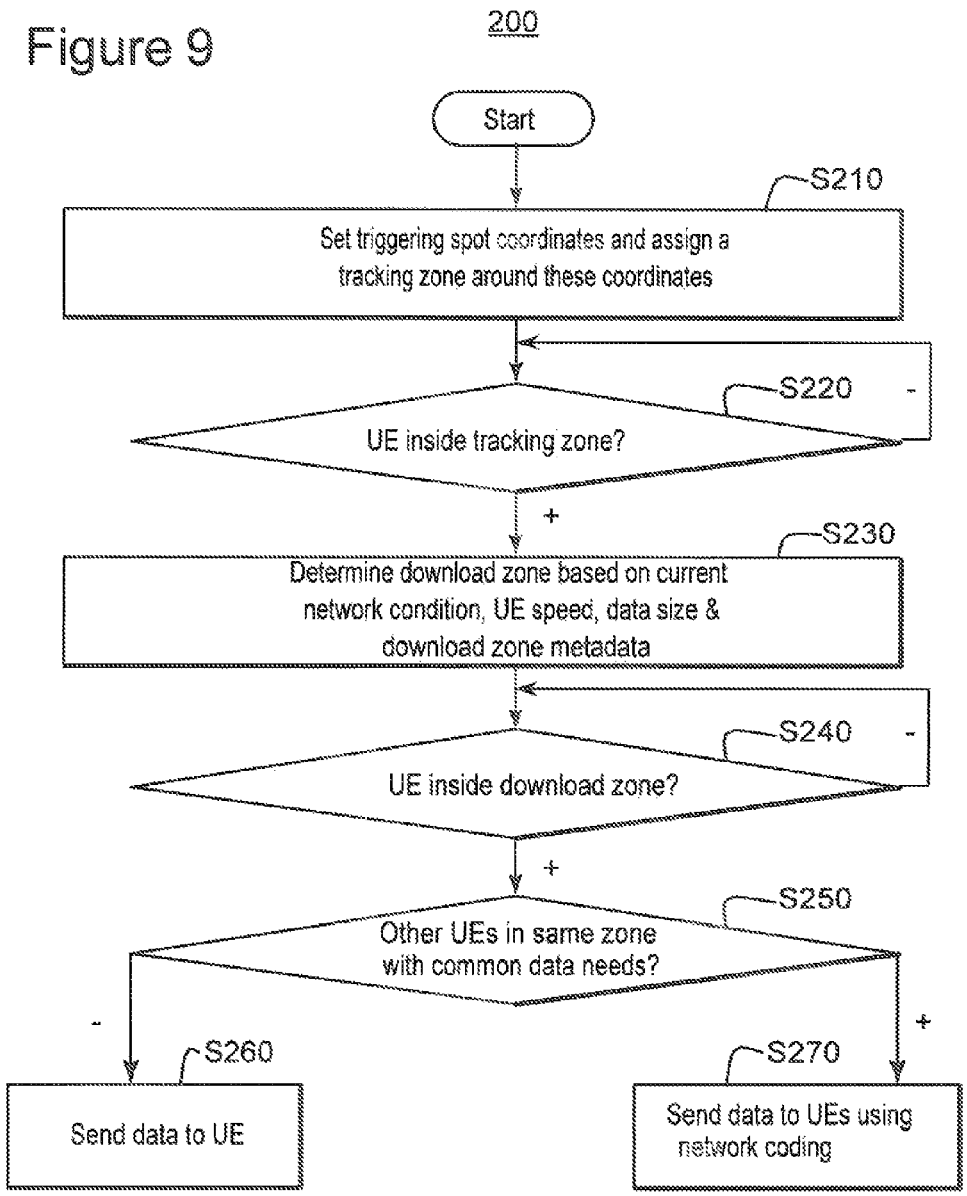
FIG. 9 is a flow diagram of a method according to another exemplary embodiment.

FIG. 9 illustrated a flow diagram of a method 200 according to another exemplary embodiment. At S210, triggering spot coordinates are set and a tracking zone is assigned around these coordinates. At S220, it is determined whether a mobile device (e.g., UE, User Equipment) is inside the tracking zone. Once the mobile device is inside the tracking zone, information about the mobile device is gathered to determine its speed, whether and what applications that rely on permanent constant availability of data transfer are currently used or may be used, whether pertinent data has already been downloaded in the mobile device and it is up-to-date, a volume of the data of interest, the mobile device's download rate capability, mobile device's speed, network load, etc. Based on this information, a download zone is defined for the mobile device, at S230.

If the mobile device enters the download zone, at S240, the data is sent to the mobile device at S260 or S270. If at S250, it is determined that there is another mobile device located in the same area as the mobile device and ready to receive data simultaneously, data for both mobile devices is sent using network coding at S270. If another device is not found, the data of interest is simply transmitted to the mobile device at S260.

Figure 10:
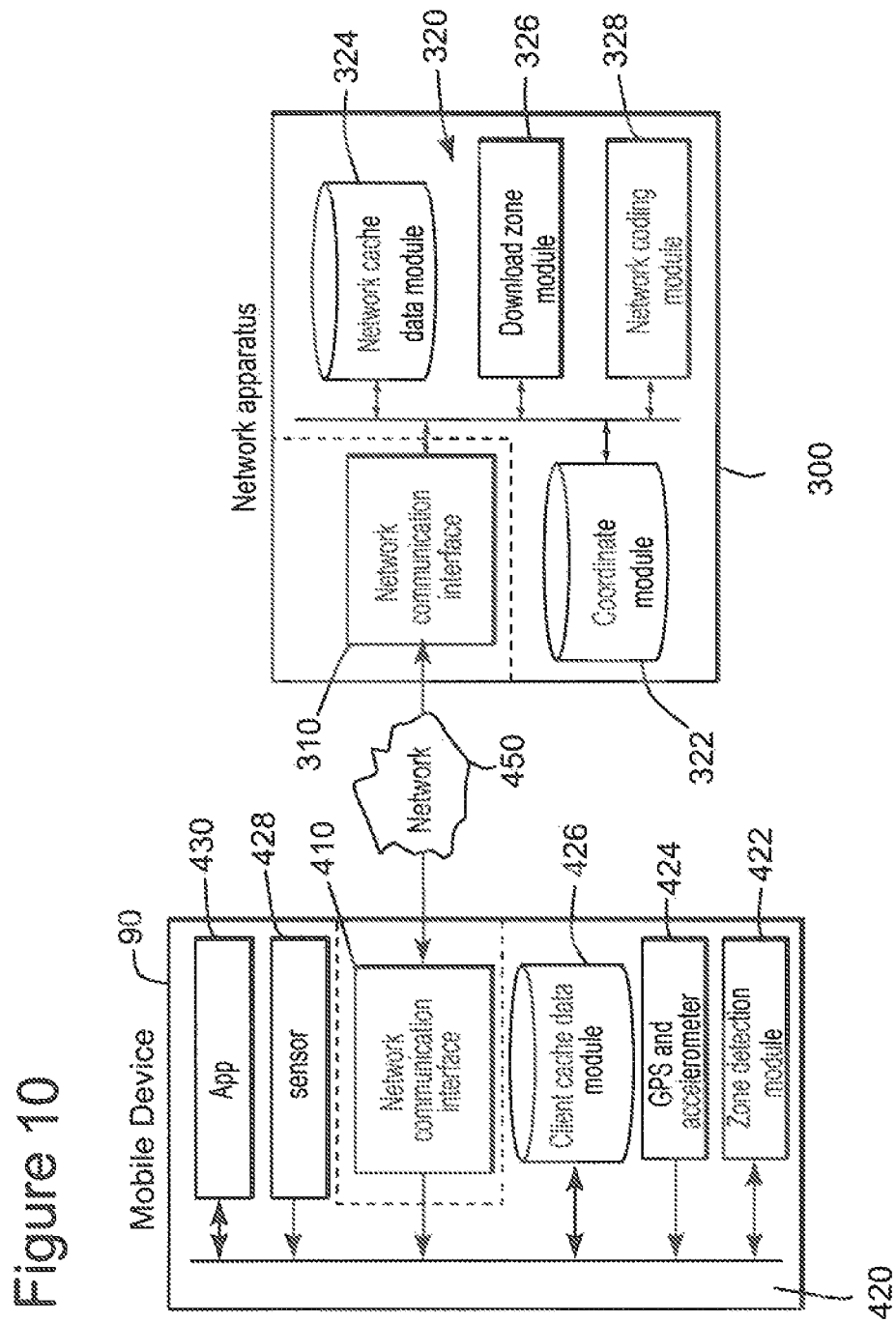
FIG. 10 is a schematic diagram of network devices employed to perform methods of preemptive downloading according to an exemplary embodiment.

Considering now the network devices employed to perform methods of preemptive downloading, FIG. 10 illustrates a network apparatus 300 having a network communication interface 310 and a data processing unit 320. The network communication interface 310 is configured to enable data exchange with other devices via the network 450. The data processing unit 320 is configured (1) to determine that a mobile device has entered a predetermined tracking zone related to a black spot zone, (2) to define a download zone for the mobile device taking into consideration a time necessary for downloading data of interest to the mobile device, and a predicted time interval until the mobile device enters the black spot zone, and (3) to send the data via the network communication interface, when the mobile device enters the download zone.

The data processing unit 320 has at least one processor and includes functional modules that are combinations of hardware and software. Thus, the data processing unit 320 may include a coordinate module 322 configured to store coordinates of one or more triggering spots and/or one or more sets of coordinates defining black spot zone(s), together with corresponding tracking zone(s). The data processing unit 320 may also include a network cache data module 324 configured to store data of interest (e.g., data objects related to a store). The data processing unit 320 may further include a download zone module 326 configured to determine the download zone for a mobile device inside the tracking zone based e.g. on the mobile device's current position, speed, volume of data of interest, estimated download rate, etc. The data processing unit 320 may also include a network coding module 328 configured to determine if the data of interest is to be sent using network coding, and if it is the case to apply pertinent network coding techniques.

In one exemplary embodiment there is a network apparatus 300 for downloading data to a mobile device in anticipation of the mobile device entering a black spot zone, the network apparatus having a network communication interface 310 and a data processing unit 320. The network communication interface is configured to enable data exchange with other devices via a network 450. The data processing unit 320 is configured to determine that a mobile device has entered a predetermined tracking zone related to the black spot zone. The data processing unit 320 is further configured to gather information for defining a download zone for the mobile device taking into consideration a time necessary for downloading the data to the mobile device, and a predicted time interval until the mobile device enters the black spot zone. The data processing unit 320 is further configured to send the data via the network communication interface, when the mobile device enters the download zone.

In one embodiment of the network apparatus, the data processing unit is further configured to define the download zone.

In one embodiment, the network apparatus further comprises a network coding module 328. The network coding module 328 is configured to determine if there is a second mobile device in the same download zone as the mobile device, and to send second data for the second mobile device using network coding.

In one embodiment, the network apparatus further comprises one or more of a coordinate module 322, and a network cache data module 324. The coordinate module 322 is configured to store coordinates related to one or more black spot zones and related predetermined tracking zones, and the network cache data module 324 is configured to retrieve the data from various sources in the network and temporarily store the data.

In one embodiment, the network apparatus is a server.

Although in principle the method should be applied for any mobile device (e.g., cell phone, i-pad, etc.), software modules may be enhanced or added therein. Thus, a mobile terminal 90 capable to receive data of interest in anticipation of the mobile device entering a black spot zone includes a network communication interface 410 and a data processing unit 420. The network communication interface 410 is configured to enable data exchange with other devices via the network 450, e.g., with the network apparatus 300. The data processing unit 420 is configured to determine that a current location of the mobile device is inside a tracking zone associated with a black spot zone, and may be configured to e.g. to provide position, speed information, etc. via the network communication interface to the network apparatus 300.

The data processing unit 420 has at least one processor and includes functional modules that are combinations of hardware and software. Thus, the data processing unit 420 may include a zone detection module 422 that may be configured to detect when the mobile device is in the tracking zone and/or in the download zone. The data processing unit 420 may also include a GPS and acceleration module 424 configured to determine the mobile device's current GPS coordinates and speed. The data processing unit 420 may further include a client cache data module 426 configured to store downloaded data objects. The data processing unit 420 may also include other sensors 428, such as, a camera, and an application repository 430.

According to one exemplary embodiment there is a mobile device 90 for downloading data from a network apparatus in anticipation of the mobile device entering a black spot zone, the mobile device having a network communication interface 410 and a data processing unit 420. The network communication interface 410 is configured to enable data exchange with other devices via a network 450. The data processing unit 420 is configured to determine that the mobile device has entered a predetermined tracking zone related to a black spot zone. The data processing unit 420 is further configured to gather information for defining a download zone for the mobile device taking into consideration a time necessary for downloading the data to the mobile device, and a predicted time interval until the mobile device enters the black spot zone. The data processing unit 420 is further configured to receive the data via the network communication interface, when the mobile device enters the download zone.

In one exemplary embodiment of the mobile device, the data processing unit 420 is further configured to determine that a current location of the mobile device is inside a tracking zone related to the black spot zone.

In one embodiment of the mobile device, the data processing unit further comprises one or more of a zone detection module 422 configured to detect when the mobile device is in the tracking zone and/or in the download zone, a Global Positioning System, GPS, and acceleration module 424 configured to determine the mobile device's current GPS coordinates and speed, a client cache data module 426 configured to store downloaded data objects, and other sensors.

Turning now to the manner of determining the download zone, current network conditions may be considered in addition to mobile device related factors. Specifically a cell throughput for the cell serving the mobile device may be considered. The download zone is determined such that to be able to pre-cache data objects into the mobile device before the mobile device enters the black spot zone. In one embodiment, the area of the download zone is dependent on how fast the mobile device moves towards the triggering spot or the black spot zone, and also on the cell throughput.

For example, r a radius of the download zone (i.e., a distance between triggering spot and outer limit of the download zone) is a product of s, the speed of the mobile device (e.g., detected by an accelerometer) and t, a time necessary to download data of interest with current network throughput: r=s×t. The time necessary to download data of interest with current network throughput may be calculated as a ratio of the amount of data of interest (i.e., the size of the data object(s) to be pre-cached) and the available cell throughput: t=data size/available cell throughput. The cell throughput is current throughput of the cell serving the mobile device and may be measured or estimated by the network cache.

The shape of the download zone may vary depending on many factors, such as, the layout around the triggering spot in relation to obstructions (e.g. pillars, walls), the presence of man-made or natural obstacles in the vicinity of the triggering spot (e.g. other building, trees etc.). For example, the download zone may have a shape of a polygon with curved edges, but other shapes of the download zone are possible.

Figure 11:
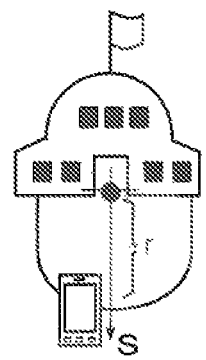
FIG. 11 is a diagram used to explain a manner of determining a download zone according to an exemplary embodiment.

A numeric example illustrates how the radius r of a semicircular download zone (e.g., extending in South direction as illustrated in FIG. 11) is determined: Object(s) data size=1 MB, available throughput=2 Mb/s, yields t=1 MB/2 Mb/s=4 sec; if s=1.25 m/s (walking), then r=1.25×4 m=5 m. Thus, the download zone should extend 5 m from the triggering spot.

Figure 12:
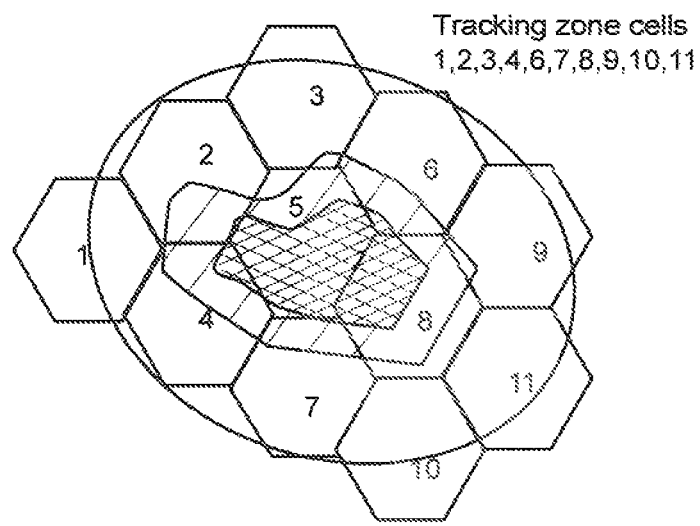
FIG. 12 illustrates radio cells assigned to a tracking zone according to an exemplary embodiment.

If a GPS receiver is permanently ON in a mobile device it drains the battery. Therefore, it is desirable to find an alternative to using GPS to locate a mobile device inside a tracking zone for pre-caching data of interest when approaching a black spot zone. Instead of accurately identifying the mobile device's position, radio cells of the network are assigned to tracking zones. Once a mobile device is served by one of the cells in a tracking zone, the GPS receiver may be turned ON to provide the position and speed information necessary to determine the download zone. For example, in FIG. 12, cells 1-4 and 6-11 are the tracking zone for the black spot zone covering most of cell 5.

In another embodiment, WiFi hotspots are assigned to be a tracking zone, for example, the Service Set Identifier (SSID) of the WiFi hotspots may be used to determine if a mobile device is in a tracking zone.

Figure 13:
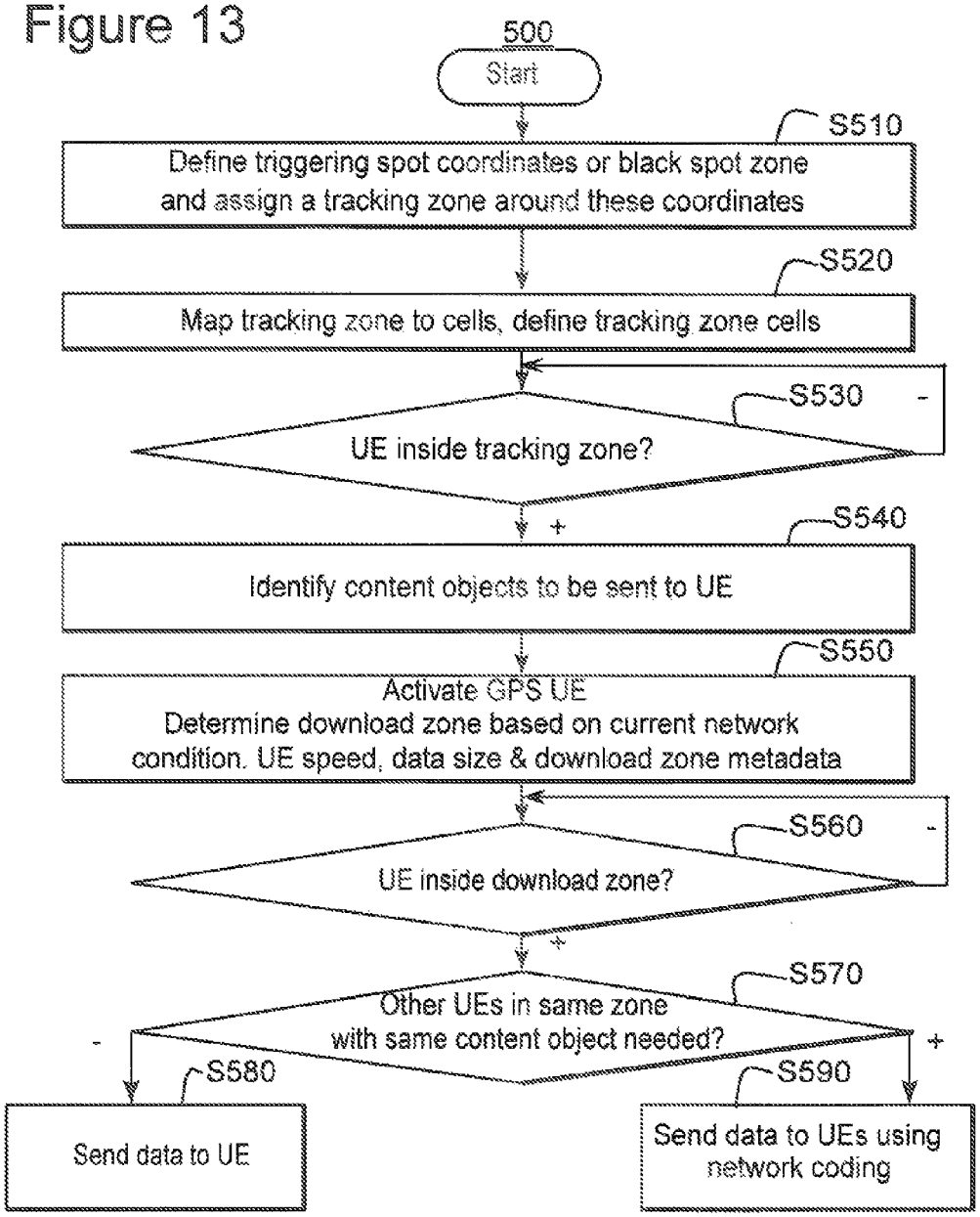
FIG. 13 is a flow diagram of a method in which determining whether a mobile device is in a tracking zone is achieved using radio cells according to an exemplary embodiment.

FIG. 13 is a flow diagram of a method 500 for downloading data to a mobile device in anticipation of the mobile device, in which radio cells are used relative to determining whether a mobile device is in a tracking zone. The method 500 includes defining triggering spot coordinates or black spot zone coordinates and assigning a tracking zone related to these coordinates, at S510. The method S500 further includes mapping the tracking zone to cells to select tracking zone cells, at S520. The method S500 then includes determining whether a mobile device (UE) is in a tracking zone cell, at S530. If a mobile device is found in a tracking cell, data of interest (i.e., objects to be sent to the mobile device) are identified, at S540. The GPS receiver of the mobile device is then activated to be able to gather information about the mobile device (e.g., position, speed, etc.) in order to determine the download zone at S550. Here, it should be understood that tracking zone does not necessarily cover all the area of all tracking cells. When a mobile device is in a tracking cell, its GPS receiver which may be otherwise inactive is activated to provide precise position information, thereby enabling to proceed preparing a potential preemptive data download if the mobile device is located inside the actual tracking zone.

If, at S560, the mobile device enters the determined download zone heading towards the black spot zone, the data of interest is downloaded at S580 or S590 depending on whether another mobile device is found at S570 in the same zone and with same object content needs to use network coding.

Figure 14:
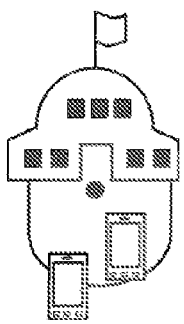
FIG. 14 illustrates a situation in which network coding can be used according to an exemplary embodiment.
Figure 15:
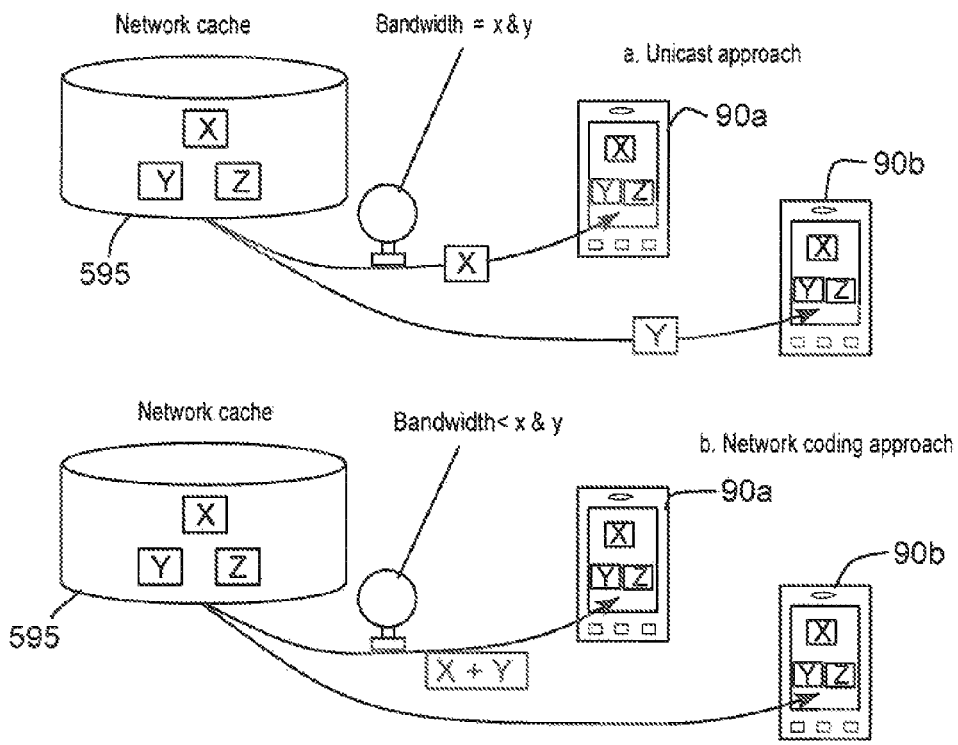
FIG. 15 illustrates difference between an unicast approach and a network coding approach for downloading data of interest to two mobile devices according to an exemplary embodiment.

Discussing now in more detail optimizing bandwidth with network coding, if there are overlapping download zones as illustrated in FIG. 14, it is possible to transfer common data objects using network coding. Consider that for a set of objects xyz stored in a network cache 595 as illustrated in FIG. 15, a first mobile device 90a needs to have downloaded object x to replace object x' currently stored therein, but does not need objects y and z. The second mobile device 90b needs to have downloaded object y to replace object y' currently stored therein, but does not need object x and z.

In a unicast approach illustrated in the upper half of FIG. 15, object x is sent to the first mobile device and object y is sent to the second mobile device, thereby using a bandwidth x&y. However, in a network coding approach illustrated in the lower half of FIG. 15, an object x+y (i.e., x XOR y) is sent both to the first mobile device and to the second mobile device, using less bandwidth than the bandwidth x&y used in the unicast approach.

Figure 16:
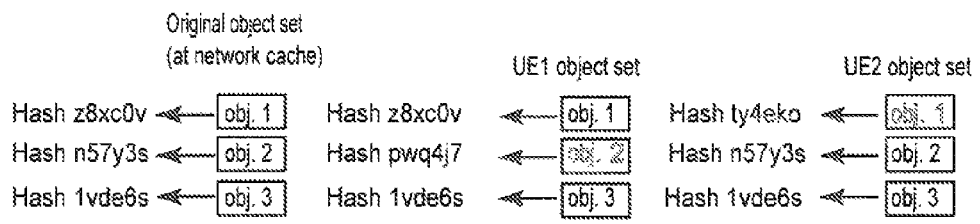
FIG. 16 illustrates the use of hashes to determine data of interest according to an exemplary embodiment.

Hashes may be used to determine whether one or more objects already stored in the mobile devices need to be updated. The use of hashes is illustrated in FIG. 16. The difference between the hash of Obj. 2 in the object set stored in UE1 (middle column) and the hash of Obj. 2 in the object set stored in the network cache (left column) indicates that the Obj. 2 is data of interest for UE1 needing to be updated. Similarly, the between the hash of Obj. 1 in the object set stored in UE2 (right column) and the hash of Obj. 1 in the object set stored in the network cache indicates that the Obj. 1 is data of interest for UE2 needing to be updated. A compound object (Obj.1 XOR Obj. 2) is then created at the network cache and sent to UE1 and UE2. UE1 extracts Obj.2 from the compound object (Obj.1 XOR Obj. 2) based on knowing Obj.1, and UE2 extracts Obj.1 from the compound object (Obj.1 XOR Obj. 2) based on knowing Obj.2.

Figure 17:
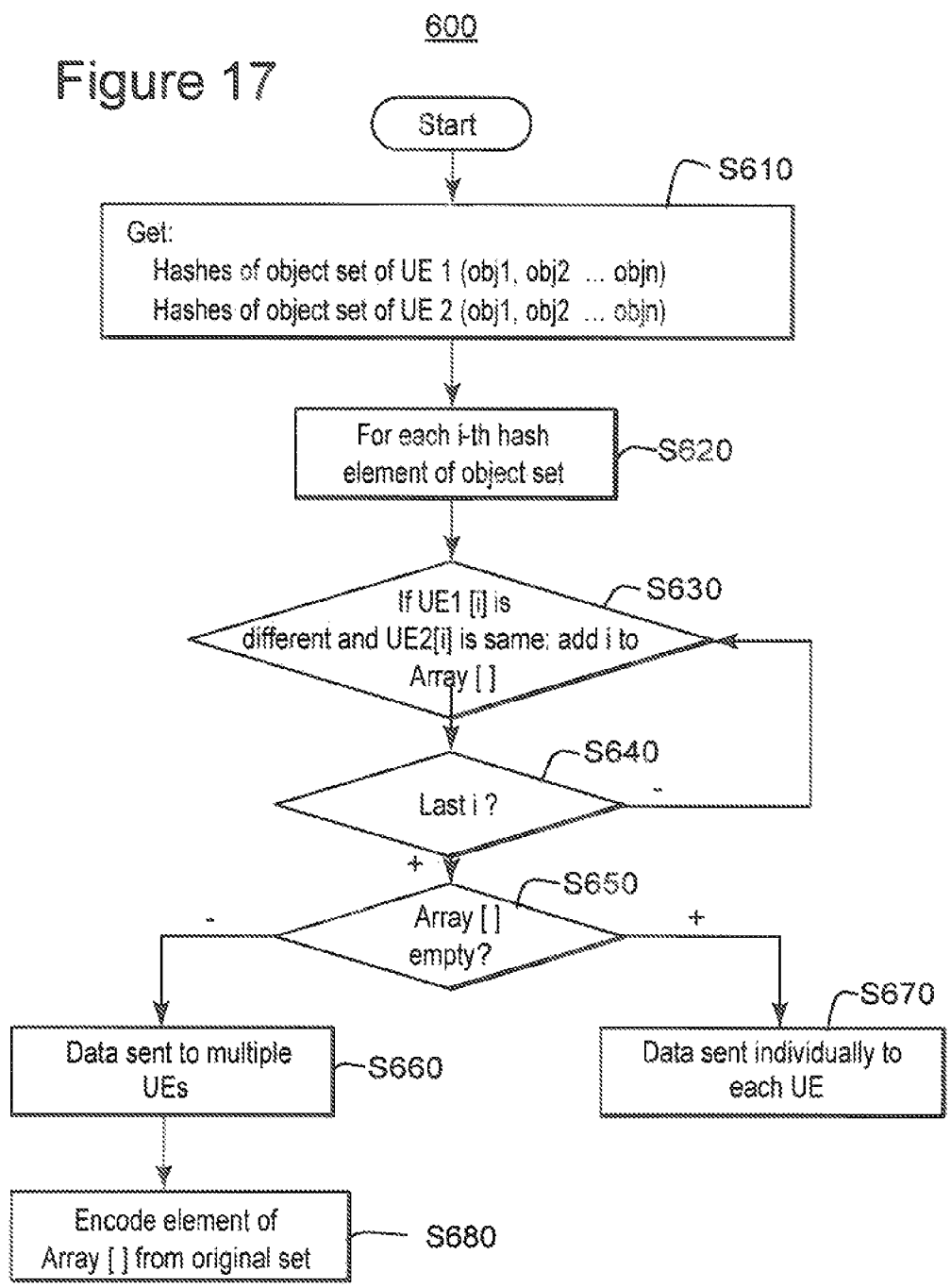
FIG. 17 is a flow diagram of a method for determining data of interest using hashes according to an exemplary embodiment.

A flow diagram of a method 600 for determining data of interest to be sent using network coding is illustrated in FIG. 17. The method 600 includes getting hashes of the set of objects stored in UE1 and UE2, at S610. Further the method includes a loop starting at S620 performing S630 and S640 for each object in the sets. At S630 if the hashes of corresponding i-th object stored in UE1 and UE2 are not same, the index i is stored in the Array structure. At S640, it is tested whether the condition for exiting the loop is met and if not i is incremented.

After exiting the loop, it is tested whether the Array structure is empty (i.e., all objects stored in UE1 and UE2 have the same hash), at S650. If the Array structure is not empty, data is sent to multiple UEs at S660, the elements from the original set indicated in the Array structure being encoded together at S680. If the Array structure is empty, data is sent individually to each UE, at S670.

Figure 18:
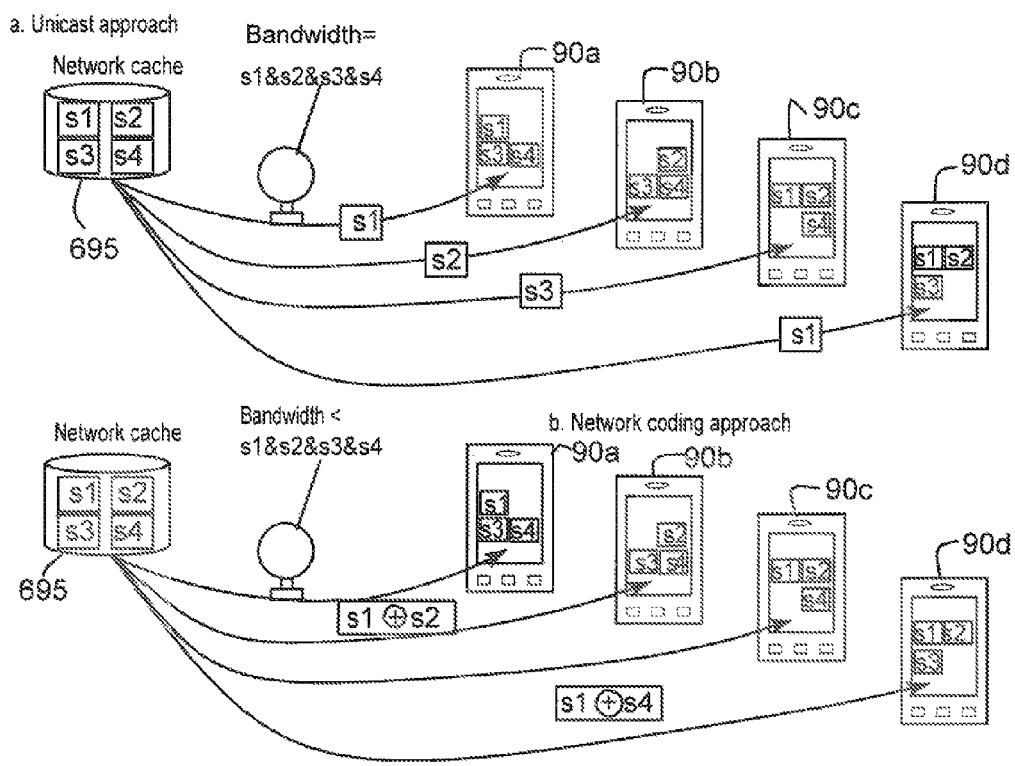
FIG. 18 illustrates difference between an unicast approach and a network coding approach for downloading data of interest to four mobile devices according to an exemplary embodiment.

The use of network coding can be extended to the case of several object data sets as illustrated in FIG. 18. Assuming four objects are stored as a data set in the network cache 695: s1, s2, s3, s4. The mobile devices have stored the following object set in their client caches, from an earlier download: mobile device 90a has s1, s3, s4; mobile device 90b has s2, s3, s4; mobile device 90c has s1, s2, s4; and mobile device 90d has s1, s2, s3. If the mobile devices 90a, 90b, 90c, and 90d 'meet' in overlapping download zones, network coding can be used to optimize bandwidth usage. Instead of sending s2 to the mobile device 90a, s1 to the mobile device 90b, s3 to the mobile device 90c and s4 to the mobile device 90d in an unicast approach illustrated in the upper half of FIG. 18, object (s1 XOR and s2) is sent to the mobile devices 90a and 90b, and object (s3 XOR s4) is sent to the mobile devices 90c and 90d according to a network coding approach.

Figure 19:
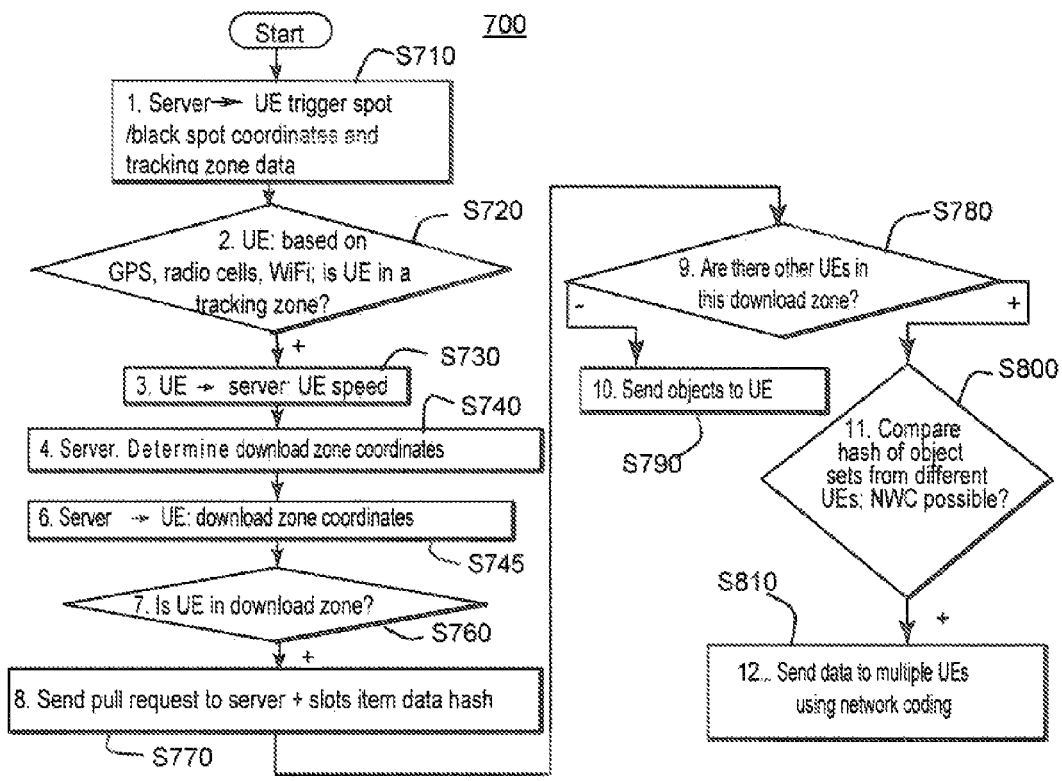
FIG. 19 is a flow diagram of a method for interworking of the UE and server (i.e. network apparatus) modules according to another exemplary embodiment.

FIG. 19 is a flow diagram of a method 700 for interworking of the UE and server (i.e. network apparatus) modules. At S710, the server sends to the UE triggering spot or black spot zone coordinates and tracking zone information. At S720, it is determined whether the UE is in the tracking zone using the GPS, radio cells or a WiFi hotspot. At S730, the UE informs the server about its speed. At S740, the server determined the download coordinates. At S760, it is determined whether the UE is inside the download zone. If the UE is inside the download zone, a request for download data is sent to the server with hashes of the objects already stored in the UE, at S770. The server then determined whether there are other UEs in the download zone at S780. If there are no other UEs, the server sends the objects to the UE at S790. If there are other UEs, the hashes of object stored in different UEs are compared at S800 to determine whether network coding can be used to send the data to multiple UEs using network coding at S810.

It should be understood that beyond a GPS receiver being located in the mobile device and the data of interest being located in a network apparatus, a precise location of determining the download area and triggering the actual preemptive download of interest may be performed in either the mobile device or the network apparatus according to various embodiments. The network apparatus may be a network cache storing the data of interest, but it may be another network apparatus that would control the network apparatus where the data of interest is stored to send the data after performing all the other operations related to the preemptive download.

The network apparatus may be e.g. a network controller node or radio access node or the network apparatus may e.g. be located in any such nodes. In one embodiment, such as in a mobile, or radio-access, network of the third generation, a 3G mobile network, the network apparatus may be a Radio Network Controller (RNC) or located in a RNC. In other embodiments, such as in a LTE (Long Term Evolution) radio-access network, the network apparatus may be, or be located in, an eNodeB (evolved NodeB) or a controller node.

FIG. 20 illustrates a flow diagram of a method 900 performed by a mobile device to enable receiving data of interest in anticipation of the mobile device entering a black spot zone. The method 900 includes obtaining information on a tracking zone associated with the black spot zone, at S910. For example, in one embodiment, the mobile device may receive the coordinates of the tracking zone. In another embodiment, the mobile device may receive first information related to tracking cells as discussed above. Once the mobile device determines that it is in a tracking cell, it would turn ON its GPS receiver and requests or simply receives information about the coordinates of the tracking zone. Then whether the mobile device enters the actual tracking zone may be determined by the mobile device based on the GPS information and/or by the network apparatus.

The method 900 further includes at least sending information regarding mobile device's speed, at S920 and receiving the data of interest if the mobile device enters a download zone related to the black spot, at S930. However, the method may also include obtaining information on the download zone. In one embodiment, the mobile device may receive the information from the network apparatus. In another embodiment, the mobile device may determine the download zone. Assuming that the mobile device has information on the download zone, it may then determine whether the mobile device is in the download zone and send an indication to the network apparatus, thus triggering it to transmit the data of interest. Thus, in one embodiment, whether the mobile device has entered the download zone may be determined by the mobile device. In other embodiments, the network apparatus determines that the mobile device has entered the download zone.

In one embodiment, the preemptive download of data to a mobile device may occur according to the following scenario:
1. The mobile device (e.g., a UE) receives the coordinates of the tracking zone from the network apparatus (e.g., a server). If the mobile device internally determines that it is in the tracking zone, the mobile device sends a message to the network apparatus.
2. The network apparatus calculates the download zone based on the current available throughput in the cell serving the mobile device, the amount of the data of interest and the speed of the mobile device. The network apparatus send the coordinates of the download zone to the mobile device.
3. The mobile device receives the coordinates of the download zone, and, then, when it internally determines that it is in the download zone, the mobile device sends a message to the network apparatus.
4. The network apparatus may then determine if to send the data of interest to the mobile device using unicast or it is possible to send data to several mobile devices using network coding.
5. The mobile device receives the data of interest.

Embodiments of the method find use, for example, in augmented reality comparison shopping. Augmented reality comparison shopping is a method to do comparison shopping using a camera and special image recognition application on a mobile device (a User Equipment, UE), e.g. a smart phone. The camera scans a barcode or even the image of a product, recognizes it and provides the user with price comparison information. Known comparison shopping, however, requires interaction with a remote server performing the actual price comparison for the scanned product. One exemplary use of preemptive downloading of data to a mobile device for enabling augmented reality comparison shopping in an area where the mobile network, and hence the comparison shopping server, is unavailable due to shielding, out of coverage, high load, etc, is shown in FIG. 21. According to the method 1000, at S1010 the system detects a UE (thus, in practice, a user) entering the download zone related to a black spot zone and sends the store items, such as price information, image etc, to the UE at S1020. At S1030 the user scans the barcode, or the product image, with the UE camera. With the scanned information the UE is able to recognize the item and compare prices from different stores at S1040, and the result is displayed to the user via the UE user interface at S1050, e.g. displaying a green flag if the item is cheap compared to other stores or a red flag if expensive compared to other stores.

Figures 22A, 22B:
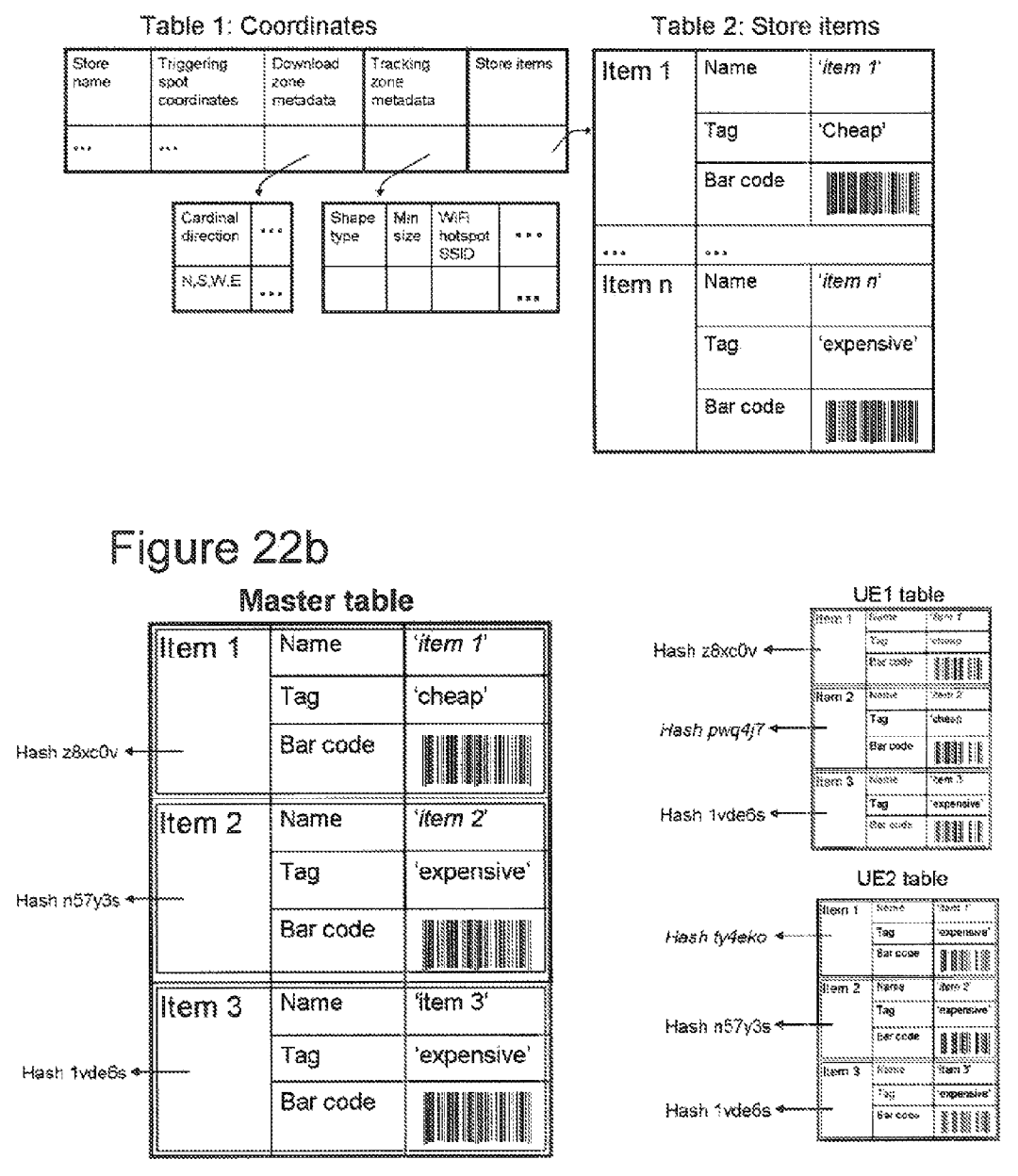

FIG. 22*a* shows exemplary set of tables for an augmented reality comparison shopping application comprising a first table, Table 1, comprising data relating to the zones' location and size for a particular store, and a Table 2 comprising detailed data for the store items. Some parts of the store items table may change at any time due to e.g. changes in price. The implication of this is that a full table downloaded at time t1 may have become partially outdated at time t2. This fact is exploited by the use of network coding to optimize the amount of data transferred to multiple UEs. According to one embodiment illustrated in FIG. 22*b*, to be able to easily determine that the items are outdated, a hash table is made of each row of the table of the store items table, Table 2.

The concept of network coding may also be extended to the case of tables of different stores across several UEs. In the event that the UEs 'meet' in overlapping download zones, network coding can be used to optimize bandwidth usage.

FIG. 23 is a signaling diagram of an exemplary use of the method wherein the preemptive download of data to a mobile device may occur according to the following scenario:
1. A set of triggering spot coordinates are sent to the UE, via the network communication interface. The set could be determined by the provider of the service, user preference or by recommendation etc.
2. The network communication interface delivers the coordinates to the UE zone detection module.
3. UE gets its GPS coordinates. This is fed to the zone detection module which determines if the UE is inside the tracking zone. Alternatively WiFi SSID could be used.
4. If the UE is inside the tracking zone, its speed is sent to the server download zone module in the network apparatus, via the network communication interface. In this embodiment, this information enables the network apparatus to determine that the UE has entered the tracking zone.
5. The download zone coordinates are determined based on UE speed, cell throughput and data size.
6. Download zone coordinates are sent to UE.
7. UE continuous to gets updates of its current position. The UE makes a test if it is inside the download zone. If the UE is inside zone, it indicates this to the server.
8. A data request is sent from the UE to the server along with hashes of data it already may have from previous pre-caching. The server determines if network coding should be used to deliver the data.
9. Data is sent to UE; to single UE if there is no overlap with another UE.
10. If there are multiple UEs in an overlapping download zone, the common data is sent to the network coding module.
11. The data is encoded
12. Encoded data is sent to multiple UEs at the same time.
13. Whilst being in the black spot zone, the user captures a barcode of an item in the store with the UE's camera.
14. The barcode is recognized by the UE.
15. The barcode is sent to the client cache and compared to existing barcodes in the cache.
16. If there is a hit, the user data (e.g. tag and metadata) is displayed to the user via the UE's GUI (Graphical User Interface).

At least some of the above-described embodiments provide the following advantages. In the areas where there is no network coverage, e.g. due to shielding, end users can continue using applications (e.g., shopping, music, maps) that depend on data residing on remote server. By using these embodiments, the application service providers are able to ensure a consistent experience for the end users. The network operators that make available these embodiments would receive new revenue from application service providers. The various embodiments make it possible besides using GPS receiver to use radio cells and WiFi to determine when to start pre-cache procedures thereby avoiding draining the mobile device's battery.

It should be understood that this description is not intended to limit the embodiments. On the contrary, the exemplary embodiments are intended to cover alternatives, modifications and equivalents, which are included in the spirit and scope of the inventive concept. Further, in the detailed description of the exemplary embodiments, numerous specific details are set forth in order to provide a comprehensive understanding of the inventive concept. However, one skilled in the art would understand that various embodiments may be practiced without such specific details.

As also will be appreciated by one skilled in the art, the exemplary embodiments may be embodied in a network device, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for downloading data from a network apparatus to a mobile device in anticipation of the mobile device entering a black spot zone with sluggish or no network access, the method comprising, in the network apparatus:
   determining whether the mobile device has entered a predetermined tracking zone related to the black spot zone;
   when the mobile device has entered the predefined tracking zone, gathering information for defining a download zone for the mobile device to receive the data expected to be needed while the mobile device is going to be in the black spot zone;
   defining the download zone taking into consideration a time necessary for downloading the data to the mobile device, and a predicted time interval until the mobile device enters the black spot zone; and
   sending the data from the network apparatus to the mobile device when the mobile device enters the download zone.

2. A method according to claim 1 wherein defining the download zone is performed in the network apparatus.

3. A method according to claim 2 wherein the gathering of information comprises the network apparatus receiving information regarding mobile device's speed from the mobile device.

4. A method according to claim 1 wherein the method further comprises, in the network apparatus, upon determining that the mobile device has entered the tracking zone:
   sending information regarding the volume of the data to the mobile device; and
   receiving information defining the download zone from the mobile device.

5. A method according to claim 1 wherein the method further comprises:
   determining that there is a second mobile device in the same download zone as the mobile device; and
   sending second data for the second mobile device using network coding.

6. A method according to claim 1 wherein determining that the mobile device has entered the tracking zone comprises receiving, in the network apparatus, information from the mobile device that the mobile device has entered the tracking zone.

7. A method according to claim 1 wherein factors affecting the time necessary for downloading the data to the mobile device are one or more of current network load, a volume of the data, a predicted time while the mobile device is going to be in the black spot zone.

8. A method according to claim 1 wherein a factor affecting the time interval until the mobile device enters the black spot zone is a speed of the mobile device.

9. A non-transitory computer-readable storage medium storing computer program instructions which, if executed by a processor, cause the processor to perform a method as set out in claim 1.

10. A method for downloading data from a network apparatus to a mobile device in anticipation of the mobile device entering a black spot zone with sluggish or no network access, the method comprising, in the mobile device:
    determining whether the mobile device has entered a predetermined tracking zone related to the black spot zone;
    when the mobile device has entered the predetermined traffic zone, gathering information for defining a download zone for the mobile device to receive the data expected to be needed by the mobile device while in the black spot zone;
    defining the download zone taking into consideration a time necessary for downloading the data to the mobile device, and a predicted time interval until the mobile device enters the black spot zone; and
    receiving the data from the network apparatus when the mobile device enters the download zone.

11. A method according to claim 10 wherein defining the download zone is performed in the mobile device.

12. A method according to claim 10 further comprising the mobile device upon entering the tracking zone receiving information on a volume of the data to be downloaded to the mobile device from the network apparatus.

13. A method according to claim 10 wherein the gathering of the information comprises the mobile device sending information regarding the mobile device's speed to the network apparatus.

14. A network apparatus for downloading data to a mobile device in anticipation of the mobile device entering a black spot zone with sluggish or no network access, the network apparatus having a network communication interface and a data processing unit, wherein the network communication interface is configured to enable data exchange with other devices via a network and the data processing unit is configured:
- to determine whether a mobile device has entered a predetermined tracking zone related to the black spot zone;
- when the mobile device has entered the predetermined tracking zone, to gather information for defining a download zone for the mobile device to receive the data expected to be needed while the mobile device is going to be in the black spot zone;
- to define the download zone taking into consideration a time necessary for downloading the data to the mobile device, and a predicted time interval until the mobile device enters the black spot zone; and
- to send the data via the network communication interface, when the mobile device enters the download zone.

15. A network apparatus according to claim 14 wherein the data processing unit is further configured to define the download zone.

16. A network apparatus according to claim 14 further comprising a network coding module, whereby the network coding module is configured to determine if there is a second mobile device in the same download zone as the mobile device, and to send second data for the second mobile device using network coding.

17. A network apparatus according to claim 14 further comprising one or more of a coordinate module, and a network cache data module, whereby the coordinate module is configured to store coordinates related to one or more black spot zones and related predetermined tracking zones, and the network cache data module is configured to retrieve the data from various sources in the network and temporarily store the data.

18. A network apparatus according claim 14 wherein the network apparatus is a server.

19. A mobile device for downloading data from a network apparatus in anticipation of the mobile device entering a black spot zone with sluggish or no network access, the mobile device having a network communication interface and a data processing unit wherein the network communication interface is configured to enable data exchange with other devices via a network, and the data processing unit is configured:
- to determine whether the mobile device has entered a predetermined tracking zone related to the black spot zone;
- when the mobile device has entered the predetermined tracking zone, to gather information for defining a download zone for the mobile device to receive the data expected to be needed while the mobile device is going to be in the black spot zone;
- to define the download zone taking into consideration a time necessary for downloading the data to the mobile device, and a predicted time interval until the mobile device enters the black spot zone; and
- to receive the data via the network communication interface, when the mobile device enters the download zone.

20. A mobile device according to claim 19 wherein the data processing unit is further configured to determine that a current location of the mobile device is inside a tracking zone related to the black spot zone.

21. A mobile device according to claim 19 wherein the data processing unit further comprises one or more of a zone detection module configured to detect when the mobile device is in the tracking zone and/or in the download zone, a Global Positioning System, GPS, and acceleration module configured to determine the mobile device's current GPS coordinates and speed, a client cache data module configured to store downloaded data objects, and other sensors.

\* \* \* \* \*